US012724327B2

(12) United States Patent
Ding et al.

(10) Patent No.: US 12,724,327 B2
(45) Date of Patent: Sep. 1, 2026

(54) CAMERA DEVICE

(71) Applicant: ZHEJIANG SUNNY SMARTLEAD TECHNOLOGY CO., LTD., Ningbo (CN)

(72) Inventors: Zhi Ding, Ningbo (CN); Kouwen Zhang, Ningbo (CN); Xinke Tang, Ningbo (CN); Kaixun Nong, Ningbo (CN)

(73) Assignee: ZHEJIANG SUNNY SMARTLEAD TECHNOLOGY CO., LTD., Ningbo (CN)

( * ) Notice: Subject to any disclaimer, the term of this patent is extended or adjusted under 35 U.S.C. 154(b) by 428 days.

(21) Appl. No.: 18/474,582

(22) Filed: Sep. 26, 2023

(65) Prior Publication Data

US 2024/0019768 A1 Jan. 18, 2024

Related U.S. Application Data

(63) Continuation of application No. PCT/CN2021/113164, filed on Aug. 18, 2021.

(30) Foreign Application Priority Data

Mar. 26, 2021 (CN) ......................... 202110326094.1
Mar. 26, 2021 (CN) ......................... 202110326104.1
Mar. 26, 2021 (CN) ......................... 202110326106.0

(51) Int. Cl.
*G03B 17/12* (2021.01)
*G02B 7/02* (2021.01)

(52) U.S. Cl.
CPC ............... *G03B 17/12* (2013.01); *G02B 7/02* (2013.01)

(58) Field of Classification Search
CPC ........ G03B 17/12; G03B 30/00; G03B 35/10; G02B 7/02; G02B 7/021; G02B 7/12;
(Continued)

(56) References Cited

U.S. PATENT DOCUMENTS

2015/0358605 A1* 12/2015 Müller ................. H04N 13/239 348/47
2016/0191863 A1* 6/2016 Minikey, Jr. ........... H04N 23/57 348/148
(Continued)

FOREIGN PATENT DOCUMENTS

CN 107462259 A * 12/2017 ............. G01C 22/00
CN 208924350 U * 5/2019
(Continued)

OTHER PUBLICATIONS

Title of the Item: Information on Search Strategy—EP21932512.3 Publication Date: Mar. 5, 2025 Applicant: Zhejiang Sunny Smartlead Technologies Co., Ltd. Country: EP.
(Continued)

*Primary Examiner* — Abdelaaziz Tissire
(74) *Attorney, Agent, or Firm* — JEEN IP LAW, LLC

(57) ABSTRACT

The present invention relates to a monocular or multi-ocular camera device including a lens module, a front housing, a rear housing and a fastening mechanism, the front housing having a through hole. The lens module includes a lens module block, a sensor board, and a printed circuit board connected to the sensor board. The fastening mechanism is configured to fix the lens module block passing through the through hole to the front housing. The monocular or multi-ocular camera device of the present invention is highly stable, highly reliable and highly adjustable.

16 Claims, 28 Drawing Sheets

(58) Field of Classification Search
CPC .......... G02B 7/14; G02B 7/022; G02B 7/026; H04N 23/54; H04N 23/55; H04N 23/51; H04N 23/57; H04N 13/239; H04N 23/45; H04N 23/52; H04N 23/50; H05K 1/189; B60R 11/04; B60R 2300/105; B60R 1/04; B60R 2011/004
See application file for complete search history.

(56) References Cited

U.S. PATENT DOCUMENTS

| | | | | |
|---|---|---|---|---|
| 2016/0252701 | A1* | 9/2016 | Richter | G02B 7/026<br>359/830 |
| 2016/0255260 | A1* | 9/2016 | Huang | H04N 23/55<br>348/262 |
| 2019/0381952 | A1* | 12/2019 | Wang | G02B 7/02 |
| 2020/0225439 | A1* | 7/2020 | Nakamura | H04N 23/54 |
| 2020/0324713 | A1 | 10/2020 | Lee | |
| 2020/0409017 | A1* | 12/2020 | Wei | G02B 7/022 |

FOREIGN PATENT DOCUMENTS

| | | | |
|---|---|---|---|
| CN | 112041741 | A | 12/2020 |
| CN | 216795093 | U | 6/2022 |
| CN | 217428234 | U | 9/2022 |
| EP | 2376981 | B1 | 5/2017 |

OTHER PUBLICATIONS

Title of the Item: CN202110326106.0—First office Action Publication Date: Oct. 17, 2024 Applicant: Zhejiang Sunny Smartlead Technologies Co., Ltd. Country: CN.

Title of the Item: CN202110326106.0—Second Office Action Publication Date: Feb. 19, 2025 Applicant: Zhejiang Sunny Smartlead Technologies Co., Ltd. Country: CN.

Title of the Item: CN2021103260941—First office Action Publication Date: Oct. 19, 2024 Applicant: Zhejiang Sunny Smartlead Technologies Co., Ltd. Country: CN.

Title of the Item: CN2021103260941—Second Office Action Publication Date: Mar. 1, 2025 Applicant: Zhejiang Sunny Smartlead Technologies Co., Ltd. Country: CN.

Title of the Item: CN2021103260941—Registration Procedure Notice Publication Date: Apr. 18, 2025 Applicant: Zhejiang Sunny Smartlead Technologies Co., Ltd. Country: CN.

Title of the Item: CN2021103261041—First office Action Publication Date: Nov. 14, 2024 Applicant: Zhejiang Sunny Smartlead Technologies Co., Ltd. Country: CN.

Title of the Item: CN2021103261041—Second Office Action Publication Date: Mar. 4, 2025 Applicant: Zhejiang Sunny Smartlead Technologies Co., Ltd. Country: CN.

Title of the Item: CN2023100035391—First office Action Publication Date: Mar. 29, 2024 Applicant: Zhejiang Sunny Smartlead Technologies Co., Ltd. Country: CN.

Title of the Item: CN2023100035391—Second Office Action Publication Date: Aug. 29, 2024 Applicant: Zhejiang Sunny Smartlead Technologies Co., Ltd. Country: CN.

Title of the Item: JP2024-502241—Notice of reasons for refusal Publication Date: Feb. 19, 2025 Applicant: Zhejiang Sunny Smartlead Technologies Co., Ltd. Country: CN.

Title of the Item: KR10-2023-7036469—Request for the Submission of an Opinion Publication Date: Apr. 6, 2025 Applicant: Zhejiang Sunny Smartlead Technologies Co., Ltd. Country: CN.

* cited by examiner

CAMERA DEVICE

CROSS-REFERENCE TO RELATED APPLICATIONS

The present invention claims the priority of the following three Chinese patent applications filed on Mar. 26, 2021 by the applicant, Sunny Smartlead Technology Co., Ltd.:

- application No.: 202110326104.1, title of the present invention: CAMERA DEVICE;
- application No.: 202110326106.0, title of the present invention: CAMERA DEVICE WITH AT LEAST TWO OCULAR LENSES;
- application No.: 202110326094.1, title of the present invention: CAMERA DEVICE WITH AT LEAST TWO OCULAR LENSES.

These Chinese patent applications are hereby incorporated herein by reference in their entirety.

TECHNICAL FIELD

According to a first aspect, the present invention relates to a camera device. Specifically, the present invention relates to a camera device with high stability and high reliability. According to a second aspect, the present invention also relates to a camera device with at least two ocular lenses. Specifically, the present invention relates to a camera device with at least two ocular lenses in which a lens module may be conveniently rotated around the optical axis of a lens barrel and which also have high stability and high reliability. According to a third aspect, the present invention also relates to a camera device with at least two ocular lenses. Specifically, the present invention relates to a camera device with at least two ocular lenses in which a lens pitch can be conveniently adjusted, which has high stability and high reliability, and in which a lens module can be conveniently rotated around the optical axis of a lens barrel.

BACKGROUND

With the popularity of a motorized vehicle such as an automobile and artificial intelligence, there is a need for a camera device of ADAS (Advanced Driver Assistance System) to be assembled inside the motorized vehicle. The camera device includes a monocular ADAS camera or a binocular ADAS camera.

A traditional camera device for the motorized vehicle is shown in FIGS. 1-1, 2 and 3-1 of the specification. As shown in FIG. 1-1, the traditional camera device generally includes a front housing 1, a rear housing 2, and a lens module 3. These assemblies are assembled, for example, by a screw 21 and the like to form a camera device as shown in FIG. 3-1.

As shown in FIG. 2, the lens module 3 generally includes a lens 22, a lens base 23, and a printed circuit board assembly (PCBA). The PCBA generally includes a light sensor 14 and a printed circuit board 11 integrated together. The light sensor 14 can receive a light signal from the lens 22 and convert the light signal into an electrical signal while transmitting the converted electrical signal to the printed circuit board 11. The light sensor 14 is integrated with the printed circuit board 11 to form the PCBA as a hard board. In an assembly process, the lens 22 is mounted on the lens base 23. The lens base is then fixed to the hardboard of the PCBA via the screw 21 and the like, thereby forming the lens module 3. Finally, the entire lens module 3 may be fixed to the front housing 1 or the rear housing 2 with the hardboard of the PCBA via the screw 21 or a plurality of other means known in the art.

In recent years, a monocular ADAS camera device inside the motorized vehicle have been gradually replaced by a binocular ADAS camera device. The main reason for this is because a binocular camera not only has all the functions of a monocular camera, but also recognizes depth information. But a binocular camera device has particularly stringent requirements for a tolerance of a lens pitch.

A binocular camera device for a traditional motorized vehicle is shown in FIGS. 1-2, 2, and 3-2 of the specification. As shown in FIG. 1-2, a traditional binocular camera device generally includes a front housing 1, a rear housing 2, and two camera modules 3. These assemblies are assembled, for example, by the screw 21 and the like to form the binocular camera device as shown in FIG. 3-2.

For the binocular camera device, two single camera modules 3 may fixed to the front housing 1 or the rear housing 2 with the hardboard of the PCBA via the screw 21 or the plurality of other means known in the art.

In the traditional camera device (including traditional monocular and binocular camera devices), a lens assemblage body of the lens 22 and lens base 23 is positioned as a whole in front of the hardboard of the PCBA, so that the center of gravity of the assemblage body is necessarily positioned in front of the hardboard of the PCBA. This results in a constant vibration of the lens assemblage body with the bumps of the vehicle during the travel of the vehicle. The further the center of gravity of the assemblage is from the hardboard of the PCBA, the more intense this vibration becomes. This vibration makes it possible for the connection between the lens assemblage body and the hardboard of the PCBA, the connection between the hardboard of the PCBA and the front housing 1 or the rear housing 2 and/or the connection between the lens 22 and the lens base 23 to loosen, so that the lens 22 vibrates more violently with the bumps of the vehicle relative to the body of the vehicle during the travel of the vehicle. This leads to a serious lack of stability and reliability of the traditional camera device.

In addition, the mode of fixing the two single camera modules 3 used by the traditional binocular camera device requires that the mounting angles of the two sensors in the two modules have to be matched with each other before installation. Once the mounting angles are deviated due to a fixing device such as the screw or the vibration, it is difficult to adjust the mounting angles to be matched with each other.

In addition, the traditional binocular camera device uses a long chain of structural dimensions, and the consistency of the lens pitch is difficult to control. An algorithm needs to perform more operations for this purpose to meet design requirements thereof.

Further, in the traditional binocular camera device, the mode of fixing the two single lens modules 3 makes a lens pitch generally not easily adjustable. However, in many cases, it is necessary to enable the lens pitch to be conveniently adjusted. Chinese patents No. CN201637998U and No. CN210321626U make attempts to do so. However, none of the attempts in these literatures overcomes or reduces the deficiencies as described above with respect to, for example, stability or a mounting angle, while meeting the adjustment requirements for the lens pitch.

SUMMARY

Technical Problems to be Solved by the Present Invention

On the one hand, an objective of the present invention is to provide a camera device with high stability and high reliability, which can overcome or at least reduce the inherent drawbacks that a camera device in the prior art has, as described in the background above. That is, the present invention is to provide a camera device in which the vibration of a lens of a camera device with respect to the body of a motorized vehicle is relatively small.

On the other hand, an objective of the present invention is to provide a camera device with at least two ocular lenses with high stability and high reliability in which a lens module can be conveniently rotated about the optical axis of a lens barrel, and which can overcome or at least reduce the inherent drawbacks that a binocular camera device in the prior art has, as described in the Background above. That is, the present invention is to provide a camera device with at least two ocular lenses in which the lens vibrates relatively little relative to the body of a motorized vehicle. Further, before the camera device with the at least two ocular lenses is assembled, each of at least two lens modules may be rotated about the optical axis of a lens barrel, so that the mounting angles of two sensors in the two lens modules can be easily adjusted to be matched with each other.

On the other hand, an objective of the present invention to provide a camera device with at least two ocular lenses with high stability and high reliability in which a lens pitch be conveniently adjusted, and which can overcome or at least reduce the inherent drawbacks that a binocular camera device in the prior art has, as described in the background above. That is, the present invention is to provide a camera device with at least two ocular lenses in which the lens vibrates relatively little relative to the body of a motorized vehicle and in which a lens pitch may be adjusted.

Technical Solutions to Technical Problems

In order to solve a plurality of technical problems as described above, the present invention provides the following technical solution:

Solution 1: A camera device includes a lens module, a front housing having a through hole and a rear housing connected to the front housing to form a cavity positioned between the front housing and the rear housing, wherein, the lens module includes a lens module block, a sensor board, and a printed circuit board, and the camera device also includes a fastening mechanism, wherein, the printed circuit board is positioned inside the cavity and fixedly connected to the rear housing, the lens module block includes a lens barrel having a barrel-body front end and a barrel-body rear end, the lens barrel passing through the through hole so that the barrel-body front end is positioned outside the cavity, and the barrel-body rear end is positioned inside the cavity, the sensor board is positioned inside the cavity, so that light passing through the lens barrel can reach a sensor on the sensor board, and the sensor board is further connected to the printed circuit board, the fastening mechanism is configured to fix the lens module block to the front housing.

Solution 2: For the camera device according to Solution 1, the sensor board is fixedly connected to the lens barrel.

Solution 3: For the camera device according to Solution 2, the sensor board is connected to the printed circuit board via a flexible flat cable.

Solution 4: For the camera device according to Solution 2, the sensor board and/or the printed circuit board forms a rigid-flexible board with a flexible board between the sensor board and the printed circuit board.

Solution 5: For the camera device according to any one of Solutions 1 to 4, the lens module block includes a one-piece lens module block.

Solution 6: For the camera device according to any one of Solutions 1 to 5, the fastening mechanism includes a nut, the lens barrel has a convex ring extending outwardly in the radial direction of the lens barrel at the outer periphery of the barrel-body rear end, the lens barrel further has threads formed on the outer periphery of the barrel-body front end which can cooperate with the nut, wherein, the nut has a maximum outer diameter greater than the inner diameter of the through hole, the convex ring has a maximum outer diameter greater than the inner diameter of the through hole, and the nut cooperates with the threads and clamps and fixes the lens barrel to the front housing via the convex ring positioned at the barrel-body rear end.

Solution 7: For the camera device according to Solution 6, the fastening mechanism further includes a spring pad positioned between the nut and the front housing and/or between the convex ring and the front housing.

Solution 8: For the camera device according to any one of Solutions 1 to 5, wherein, the fastening mechanism includes a nut.

the lens barrel has a convex ring extending outwardly in the radial direction of the lens barrel at the outer periphery of the barrel-body front end, and the lens barrel further has threads formed on the outer periphery of the barrel-body rear end which can cooperate with the nut, wherein, the nut has a maximum outer diameter greater than the inner diameter of the through hole, the convex ring has a maximum diameter greater than the inner diameter of the through hole, and the nut cooperates with the threads and clamps and fixes the lens barrel to the front housing via the convex ring positioned at the barrel-body front end.

Solution 9: For the camera device according to Solution 8, the fastening mechanism further includes a spring pad positioned between the nut and the front housing and/or between the convex ring and the front housing.

Solution 10: For the camera device according to Solution 8 or 9, the nut has a pit, a perforation hole or a projection on a surface facing the inner part of the cavity, so that with the pit, the perforation hole or the projection, the nut is cooperatively screwed onto the threads of the barrel-body rear end of the lens barrel by using an adjusting jig or manually.

Solution 11: For the camera device according to any one of Solutions 1 to 5, the fastening mechanism includes a blocking spring, preferably a disc spring, more preferably a diaphragm spring, and optionally a spring pad, the lens barrel has a convex ring extending outwardly in the radial direction of the lens barrel at the outer periphery of the barrel-body rear end, and the lens barrel further has an axial groove formed on the outer periphery of the barrel-body front end which can cooperate with the blocking spring, wherein, the blocking spring has a maximum outer diameter greater than the inner diameter of the through hole, the convex ring has a maximum outer diameter greater than the inner diameter of the through hole, the blocking spring cooperates with the axial groove and clamps and fixes the lens barrel to the front housing via the convex ring positioned at the barrel-body rear end, and the optional spring pad is optionally positioned between the blocking spring and the front housing and/or optionally positioned between the convex ring and the front housing.

Solution 12: For the camera device according to any one of Solutions 1 to 5, wherein, the fastening mechanism includes the blocking spring, preferably a disc spring, more preferably a diaphragm spring, and optionally a spring pad, the lens barrel has a convex ring extending outwardly in the radial direction of the lens barrel at the outer periphery of the barrel-body front end, and the lens barrel further has an axial groove formed on the outer periphery of the barrel-body rear end which can cooperate with the blocking spring, wherein, the blocking spring has a maximum outer diameter greater than the inner diameter of the through hole, the convex ring has a maximum outer diameter greater than the inner diameter of the through hole, the blocking spring cooperates with the axial groove and clamps and fixes the lens barrel to the front housing via the convex ring positioned at the barrel-body front end, and the optional spring pad is optionally positioned between the blocking spring and the front housing and/or optionally positioned between the convex ring and the front housing.

Solution 13: For the camera device according to any one of Solutions 1 to 5, wherein, the fastening mechanism includes a locking structure and optionally a spring pad, and the lens barrel has a convex ring extending outwardly in the radial direction of the lens barrel at the outer periphery of the barrel-body front end, wherein, the convex ring has a maximum diameter greater than the inner diameter of the through hole, the optional spring pad is optionally positioned between the convex ring and the front housing, the locking structure includes a snap hook protruding from the side wall of the through hole toward the inner part of the through hole and fixedly connected to the side wall of the through hole, and an L/T-shaped groove positioned at the barrel-body rear end, the L/T-shaped groove including a guiding groove extending in an axial direction of the barrel from the edge of the barrel-body rear end and a stop groove extending in a circumferential direction of a barrel body at the end of the guiding groove away from the edge of the barrel-body rear end, the guiding groove and the stop groove being L-shaped or T-shaped, the snap hook is sized to be matched with the width of the L/T-shaped groove so that the snap hook can move within the L/T-shaped groove, and when in a mounted position, the snap hook is housed in the stop groove so that the convex ring is tightly attached to the front housing or so that the convex ring is tightly attached to the front housing together with the optional spring pad, fixing the lens barrel to the front housing.

Solution 14: A camera device with two ocular lenses includes at least two lens modules, a front housing having a through hole and a rear housing connected to the front housing to form a cavity positioned between the front housing and the rear housing, wherein the lens module includes a lens module block, a sensor board, and a printed circuit board, and the camera device also includes a fastening mechanism, wherein, the printed circuit board is positioned inside the cavity, the lens module block includes a lens barrel having a barrel-body front end and a barrel-body rear end, the lens barrel passing through the through hole so that the barrel-body front end is positioned outside the cavity, and the barrel-body rear end is positioned inside the cavity, the sensor board is positioned inside the cavity and fixedly connected to the lens barrel so that light passing through the lens barrel can reach a sensor on the sensor board. The sensor board is further connected to the printed circuit board, and the fastening mechanism is configured to fix the lens module block to the front housing. The fastening structure also allows the lens module block to be rotated about the optical axis of the lens barrel before being fixed to the front housing.

Solution 15: For the camera device with the at least two ocular lenses according to Solution 14, the printed circuit board is fixedly connected to the rear housing and the sensor board is connected to the printed circuit board via a flexible flat cable.

Solution 16: For the camera device with the at least two ocular lenses according to Solution 14, the printed circuit board is fixedly connected to the rear housing, and the sensor board and/or the printed circuit board forms a rigid-flexible board with a flexible board between the sensor board and the printed circuit board.

Solution 17: For the camera device with the at least two ocular lenses according to any one of Solutions 14 to 16, the lens module block includes a one-piece lens module block.

Solution 18: For the camera device with the at least two ocular lenses according to any one of Solutions 14 to 17, the fastening mechanism includes a nut, the lens barrel has a convex ring extending outwardly in the radial direction of the lens barrel at the outer periphery of the barrel-body rear end, and the lens barrel further has threads formed on the outer periphery of the barrel-body front end which can cooperate with the nut, wherein, the nut has a maximum outer diameter greater than the inner diameter of the through hole, the convex ring has a maximum outer diameter greater than the inner diameter of the through hole, and the nut cooperates with the threads and clamps and fixes the lens barrel to the front housing via the convex ring positioned at the barrel-body rear end.

Solution 19: For the camera device with the at least two ocular lenses according to Solution 18, the fastening mechanism further includes a spring pad positioned between the nut and the front housing and/or between the convex ring and the front housing.

Solution 20: For the camera device with the at least two ocular lenses according to Solution 18 or 19, the convex ring has a pit, a perforation hole or a projection on a surface facing the inner part of the cavity, so that with the pit, the perforation hole or the projection, the lens barrel is rotated around the optical axis of the lens barrel by using an adjusting jig or manually, so as to adjust accordingly the mounting angle of the sensor board fixedly connected to the lens barrel.

Solution 21: For the camera device with the at least two ocular lenses according to any one of Solutions 14 to 17, the fastening mechanism includes a nut, the lens barrel has a convex ring extending outwardly in the radial direction of the lens barrel at the outer periphery of the barrel-body front end, and the lens barrel further has threads formed on the outer periphery of the barrel-body rear end which can cooperate with the nut, wherein, the nut has a maximum outer diameter greater than the inner diameter of the through hole, the convex ring has a maximum outer diameter greater than the inner diameter of the through hole, and the nut cooperates with the threads and clamps and fixes the lens barrel to the front housing via the convex ring positioned at the barrel-body front end.

Solution 22: For the camera device with the at least two ocular lenses according to Solution 21, the fastening mechanism further includes a spring pad positioned between the nut and the front housing and/or between the convex ring and the front housing.

Solution 23: For the camera device with the at least two ocular lenses according to Solution 21 or 22, the convex ring has the pit, the perforation hole or the projection on the surface facing the outer part of the cavity, so that with the pit, the perforation hole or the projection, the lens barrel is rotated around the optical axis of the lens barrel by using the adjusting jig or manually, so as to adjust accordingly the mounting angle of the sensor board fixedly connected to the lens barrel.

Solution 24: For the camera device according to Solution 8 or 9, the nut has a pit, a perforation hole or a projection on the surface facing the inner part of the cavity, so that with the pit, the perforation hole or the projection, the nut is cooperatively screwed onto the threads of the barrel-body rear end of the lens barrel by using the adjusting jig or manually.

Solution 25: For the camera device with the at least two ocular lenses according to any one of Solutions 14 to 17, wherein, the fastening mechanism includes a blocking spring, preferably a disc spring, more preferably a diaphragm spring, and optionally a spring pad, the lens barrel has a convex ring extending outwardly in the radial direction of the lens barrel at the outer periphery of the barrel-body rear end, and the lens barrel further has an axial groove formed on the outer periphery of the barrel-body front end which can cooperate with the blocking spring, wherein, the blocking spring has a maximum outer diameter greater than the inner diameter of the through hole, the convex ring has a maximum outer diameter greater than the inner diameter of the through hole, the blocking spring cooperates with the axial groove and clamps and fixes the lens barrel to the front housing via the convex ring positioned at the barrel-body rear end, the optional spring pad is optionally positioned between the blocking spring and the front housing and/or optionally positioned between the convex ring and the front housing, and the convex ring has the pit, the perforation hole or the projection on the surface facing the inner part of the cavity, so that with the pit, the perforation hole or the projection, the lens barrel is rotated around the optical axis of the lens barrel by using the adjusting jig or manually, so as to adjust accordingly the mounting angle of the sensor board fixedly connected to the lens barrel.

Solution 26: For the camera device with the at least two ocular lenses according to any one of Solutions 14 to 17, wherein, the fastening mechanism includes the blocking spring, preferably a disc spring, more preferably a diaphragm spring, and optionally a spring pad, the lens barrel has a convex ring extending outwardly in the radial direction of the lens barrel at the outer periphery of the barrel-body front end, and the lens barrel further has an axial groove formed on the outer periphery of the barrel-body rear end which can cooperate with the blocking spring, wherein, the blocking spring has a maximum outer diameter greater than the inner diameter of the through hole, the convex ring has a maximum outer diameter greater than the inner diameter of the through hole, the blocking spring cooperates with the axial groove and clamps and fixes the lens barrel to the front housing via the convex ring positioned at the barrel-body front end, the optional spring pad is optionally positioned between the blocking spring and the front housing and/or optionally positioned between the convex ring and the front housing, and the convex ring has the pit, the perforation hole or the projection on the surface facing the outer part of the cavity, so that with the pit, the perforation hole or the projection, the lens barrel is rotated around the optical axis of the lens barrel by using the adjusting jig or manually, so as to adjust accordingly the mounting angle of the sensor board fixedly connected to the lens barrel.

Solution 27: For the camera device with the at least two ocular lenses according to any one of Solutions 14 to 17, wherein, the fastening mechanism includes a locking structure and optionally a spring pad, and the lens barrel has a convex ring extending outwardly in the radial direction of the lens barrel at the outer periphery of the barrel-body front end, wherein, the convex ring has a maximum diameter greater than the inner diameter of the through hole, the optional spring pad is optionally positioned between the convex ring and the front housing, the locking structure includes a snap hook protruding from the side wall of the through hole toward the inner part of the through hole and fixedly connected to the side wall of the through hole, and an L/T-shaped groove positioned at the barrel-body rear end, the L/T-shaped groove including a guiding groove extending in an axial direction of the barrel from the edge of the barrel-body rear end, and a stop groove extending in a circumferential direction of a barrel body at the end of the guiding groove away from the edge of the barrel-body rear end, the guiding groove and the stop groove being L-shaped or T-shaped.

the snap hook is sized to be matched with the width of the L/T-shaped groove so that the snap hook can move within the L/T-shaped groove, and when in a mounted position, the snap hook is housed in the stop groove so that the convex ring is tightly attached to the front housing or so that the convex ring is tightly attached to the front housing together with the optional spring pad, fixing the lens barrel to the front housing, and the stop groove has a length capable of allowing the snap hook to move in the stop groove.

Solution 28: A camera device with two ocular lenses includes at least two lens modules, a front housing having one or a plurality through holes and a rear housing connected to the front housing to form a cavity positioned between the front housing and the rear housing, wherein, the lens module includes a lens module block, a sensor board, and a printed circuit board, the camera device also includes a fastening mechanism, wherein, the printed circuit board is positioned inside the cavity, the lens module block includes a lens barrel having a barrel-body front end and a barrel-body rear end, the lens barrel passing through the through hole so that the barrel-body front end is positioned outside the cavity, and the barrel-body rear end is positioned inside the cavity, the sensor board is positioned inside the cavity fixedly connected to the lens barrel so that light passing through the lens barrel can reach a sensor on the sensor board, and the sensor board is further connected to the printed circuit board, at least one of the one or the plurality of through holes is an elongate through hole, and at least one of the lens barrels passes through at least one of the elongate through holes, and the fastening mechanism is configured to fix the lens module block to the front housing, and the fastening mechanism configured to fix the lens module block in which the lens barrel passes through the elongate through hole to the front housing further allows the lens module block to be fixed to the front housing at the different positions of the elongate through hole.

Solution 29: For the camera device with the at least two ocular lenses according to Solution 28, the printed circuit board is fixedly connected to the rear housing, and the sensor board is connected to the printed circuit board via a flexible flat cable.

Solution 30: For the camera device with the at least two ocular lenses according to Solution 28, the printed circuit board is fixedly connected to the rear housing, and the sensor board and/or the printed circuit board forms a rigid-flexible board with a flexible board between the sensor board and the printed circuit board.

Solution 31: For the camera device with at least two ocular lenses according to any one of Solutions 28 to 30, at least two of the lens barrels pass through one of the elongate through holes at the same time.

Solution 32: For the camera device with the at least two ocular lenses according to any one of Solutions 28 to 31, the lens module block includes a one-piece lens module block.

Solution 33: For the camera device with the at least two ocular lenses according to any one of Solutions 28 to 32, the fastening mechanism includes a nut, the lens barrel has a convex ring extending outwardly in the radial direction of the lens barrel at the outer periphery of the barrel-body rear end, and the lens barrel further has threads formed on the outer periphery of the barrel-body front end which can cooperate with the nut, wherein, the nut has a maximum outer diameter greater than the inside diameter of the through hole through which the lens barrel passes or the width of the elongated through hole, the convex ring has a maximum outer diameter greater than the inner diameter of the through hole through which the lens barrel passes or the width of the elongated through hole, and the nut cooperates with the threads and clamps and fixes the lens barrel to the front housing via the convex ring positioned at the barrel-body rear end.

Solution 34: For the camera device with the at least two ocular lenses according to Solution 33, the fastening mechanism further includes a spring pad positioned between the nut and the front housing and/or between the convex ring and the front housing.

Solution 35: For the camera device with the at least two ocular lenses according to Solution 33 or 34, the convex ring has a pit, a perforation hole or a projection on a surface facing the inner part of the cavity, so that with the pit, the perforation hole or the projection, the lens barrel is rotated around the optical axis of the lens barrel by using an adjusting jig or manually, so as to adjust accordingly the mounting angle of the sensor board fixedly connected to the lens barrel.

Solution 36: For the camera device with the at least two ocular lenses according to any one of Solutions 28 to 32, the fastening mechanism includes a nut, the lens barrel has a convex ring extending outwardly in the radial direction of the lens barrel at the outer periphery of the barrel-body front end, and the lens barrel further has threads formed on the outer periphery of the barrel-body rear end which can cooperate with the nut, wherein, the nut has a maximum outer diameter greater than the inside diameter of the through hole through which the lens barrel passes or the width of the elongated through hole, the convex ring has a maximum outer diameter greater than the inner diameter of the through hole through which the lens barrel passes or the width of the elongated through hole, and the nut cooperates with the threads and clamps and fixes the lens barrel to the front housing via the convex ring positioned at the barrel-body front end.

Solution 37: For the camera device with the at least two ocular lenses according to Solution 36, the fastening mechanism further includes a spring pad positioned between the nut and the front housing and/or between the convex ring and the front housing.

Solution 38: For the camera device with the at least two ocular lenses according to Solution 36 or 37, the convex ring has the pit, the perforation hole or the projection on the surface facing the outer part of the cavity, so that with the pit, the perforation hole or the projection, the lens barrel is rotated around the optical axis of the lens barrel by using the adjusting jig or manually, so as to adjust accordingly the mounting angle of the sensor board fixedly connected to the lens barrel.

Solution 39: For the camera device according to Solution 26 to 38, the nut has a pit, a perforation hole or a projection on the surface facing the inner part of the cavity, so that with the pit, the perforation hole or the projection, the nut is cooperatively screwed onto the threads of the barrel-body rear end of the lens barrel by using the adjusting jig or manually.

Solution 40: For the camera device with the at least two ocular lenses according to any one of Solutions 28 to 32, wherein the fastening mechanism includes a blocking spring, preferably a disc spring, more preferably a diaphragm spring, and optionally a spring pad, the lens barrel has a convex ring extending outwardly in the radial direction of the lens barrel at the outer periphery of the barrel-body rear end, and the lens barrel further has an axial groove formed on the outer periphery of the barrel-body front end which can cooperate with the blocking spring, wherein, the blocking spring has a maximum outer diameter greater than the inner diameter of the through hole through which the lens barrel passes or the width of the elongated through hole, the convex ring has a maximum outer diameter greater than the inner diameter of the through hole through which the lens barrel passes or the width of the elongated through hole, the blocking spring cooperates with the axial groove and clamps and fixes the lens barrel to the front housing via the convex ring positioned at the barrel-body rear end, the optional spring pad is optionally positioned between the blocking spring and the front housing and/or optionally positioned between the convex ring and the front housing, and the convex ring has the pit, the perforation hole or the projection on the surface facing the inner part of the cavity, so that with the pit, the perforation hole or the projection, the lens barrel is rotated around the optical axis of the lens barrel by using the adjusting jig or manually, so as to adjust accordingly the mounting angle of the sensor board fixedly connected to the lens barrel.

Solution 41: For the camera device with the at least two ocular lenses according to any one of Solutions 28 to 32, the fastening mechanism includes the blocking spring, preferably a disc spring, more preferably a diaphragm spring, and optionally a spring pad, the lens barrel has a convex ring extending outwardly in the radial direction of the lens barrel at the outer periphery of the barrel-body front end, and the lens barrel further has an axial groove formed on the outer periphery of the barrel-body rear end which can cooperate with the blocking spring, wherein, the blocking spring has a maximum outer diameter greater than the inner diameter of the through hole through which the lens barrel passes or the width of the elongated through hole, the convex ring has a maximum outer diameter greater than the inner diameter of the through hole through which the lens barrel passes or the width of the elongated through hole, the blocking spring cooperates with the axial groove and clamps and fixes the lens barrel to the front housing via the convex ring positioned at the barrel-body front end, the optional spring pad is optionally positioned between the blocking spring and the front housing and/or optionally positioned between the convex ring and the front housing, and the convex ring has the pit, the perforation hole or the projection on the surface facing the outer part of the cavity, so that with the pit, the perforation hole or the projection, the lens barrel is rotated around the optical axis of the lens barrel by using the adjusting jig or manually, so as to adjust accordingly the mounting angle of the sensor board fixedly connected to the lens barrel.

Advantageous Effects of the Present Invention

A plurality of objectives of the present invention are realized by the various technical solutions of a plurality of aspects of the present invention.

In a first aspect, the objective to be achieved by the present invention is realized by a solution designed by the inventors of the present invention for positioning a lens module block at a front end and fixing a printed circuit board at a rear end. Specifically, during the travel of a motorized vehicle, the amplitude of vibration of the lens module of the present invention is reduced to a very small magnitude relative to the body of the vehicle, so that the good stability and reliability of a camera device of the present invention are ensured.

In a second aspect, the objective to be achieved by the present invention is realized by a solution designed by the inventors of the present invention for positioning of the lens module block at the front end. Specifically, the present invention employs the design for positioning the lens module block at the front end, and relies on the lens module block itself to be positioned with an upper housing. A pitch tolerance between lenses is accurately controlled, greatly shortening a dimensional chain between binocular lenses. That is, a camera device with at least two ocular lenses of the present invention can accurately control the pitch tolerance (i.e., baseline) between the lenses. In addition, the camera device with the at least two ocular lenses of the present invention can also easily adjust the angle of the lens module when the lens module is mounted, which can fully meet the needs of the existing algorithm for the positional degree of a binocular camera.

In a third aspect, the objective to be achieved by the present invention is realized by a solution designed by the inventors of the present invention for positioning of the lens module block at the front end with the design of the elongate through hole. Specifically, the present invention employs the design for positioning the lens module block at the front end, and relies on the lens module block itself to be positioned with an upper housing. The tolerance of a lens pitch is accurately controlled, greatly shortening the dimensional chain between binocular lenses. In addition, the design of the elongate through hole can be used to move the relative position of the lens module block arbitrarily. When the lens module is moved to a suitable position, the lens module is fixed with the fastening mechanism. This mode can be used for different needs between modules and modules by different customers, and easy to operate and practical. That is, the camera device with the at least two ocular lenses of the present invention can accurately control the distance tolerance (i.e., baseline) between the lenses, conveniently adjust a lens pitch and conveniently adjust the angle of the module when the module is mounted, which can fully satisfy the needs of the existing algorithms for the positional degree of the binocular camera.

Further, the camera device with the at least two ocular lenses provided by the present invention is also preferably provided with an adjusting mechanism in the lens module block. The at least two lens modules can be conveniently rotated around the optical axis of the lens barrel before and/or after the at least two lens modules are assembled, so that the mounting angles of the two sensors in the two lens modules can be conveniently adjusted, and thus the angles of imaging thereof can be controlled so as to be matched with each other. No force is applied to a circuit board during an adjustment process. A force is applied to a lens adjusting mechanism. Therefore, the circuit board is not deformed, and a glue is not cracked by a force. Functional requirements are met without compromising the reliability of the module itself.

Further, in the camera device with the at least two ocular lenses provided by the present invention, the solution for preferably positioning the lens module block at the front end and fixing the printed circuit board at the rear end also allows the amplitude of vibration of the lens relative to the body of the vehicle to be reduced to a very small magnitude, so that the good stability and reliability of the camera device with the at least two ocular lenses of the present invention are ensured. Further, in the camera device with the at least two ocular lenses provided in the present invention, a soft connection such as a flexible flat cable is preferably used between the sensor board and the printed circuit board. A tolerance generated during assembly and adjustment can be effectively absorbed.

Additionally, a camera assembly of the present invention can be used in many types of modules (monocular, multiocular, surround view, rear view, side view, in-cabin, etc.) for greater versatility.

Indeed, the camera assembly of the present invention may have a combination of these advantages.

BRIEF DESCRIPTION OF DRAWINGS

In order to describe the technical solutions protected by the present invention more clearly, the following briefly introduces the accompanying drawings that need to be used in the embodiments. Obviously, the accompanying drawings in the following description are only some of embodiments of the present invention. A person skilled in the art can obtain others accompanying drawings based on these accompanying drawings without creative work. It should be noted that the accompanying drawings of the specification of the present invention are exemplary only, in which the dimensions and dimensional proportions of components depicted therein do not represent the true dimensions and proportions of a product, but are intended only to present schematically the positional relationship or connection relationship between the components. The dimensions of the components may be scaled in different proportions for ease of drawing and understanding. In addition, like reference numbers are used to denote the same members or like members.

FIG. 1-2 is an exploded view schematically describing a traditional binocular camera device in the prior art.

FIG. 2 is an exploded view schematically describing a single camera module included in a camera device in the prior art as shown in FIG. 1-1 or FIG. 1-2.

FIG. 3-1 is an assembly view schematically describing a traditional camera device in the prior art as shown in FIG. 1-1.

FIG. 3-2 is an assembly view schematically describing a traditional binocular camera device in the prior art as shown in FIG. 1-2.

FIG. 5-1 is an exploded view schematically describing a preferable camera device in a first aspect of the present invention.

FIG. 5-2 is an exploded view schematically describing a preferable camera device with at least two ocular lenses in a second aspect of the present invention.

FIG. 5-3 is an exploded view schematically describing a preferable camera device with at least two ocular lenses in a third aspect of the present invention.

FIG. 8-1 is an assembly view schematically describing a preferable camera device of the present invention as shown in FIG. 5-1.

FIG. 8-2 is an assembly view schematically describing a preferable camera device with at least two ocular lenses of the present invention as shown in FIG. 5-2.

FIG. 8-3 is an assembly view schematically describing a preferable camera device with at least two ocular lenses of the present invention as shown in FIG. 5-3.

THE DESCRIPTION OF REFERENCE NUMBERS

Figure 1:
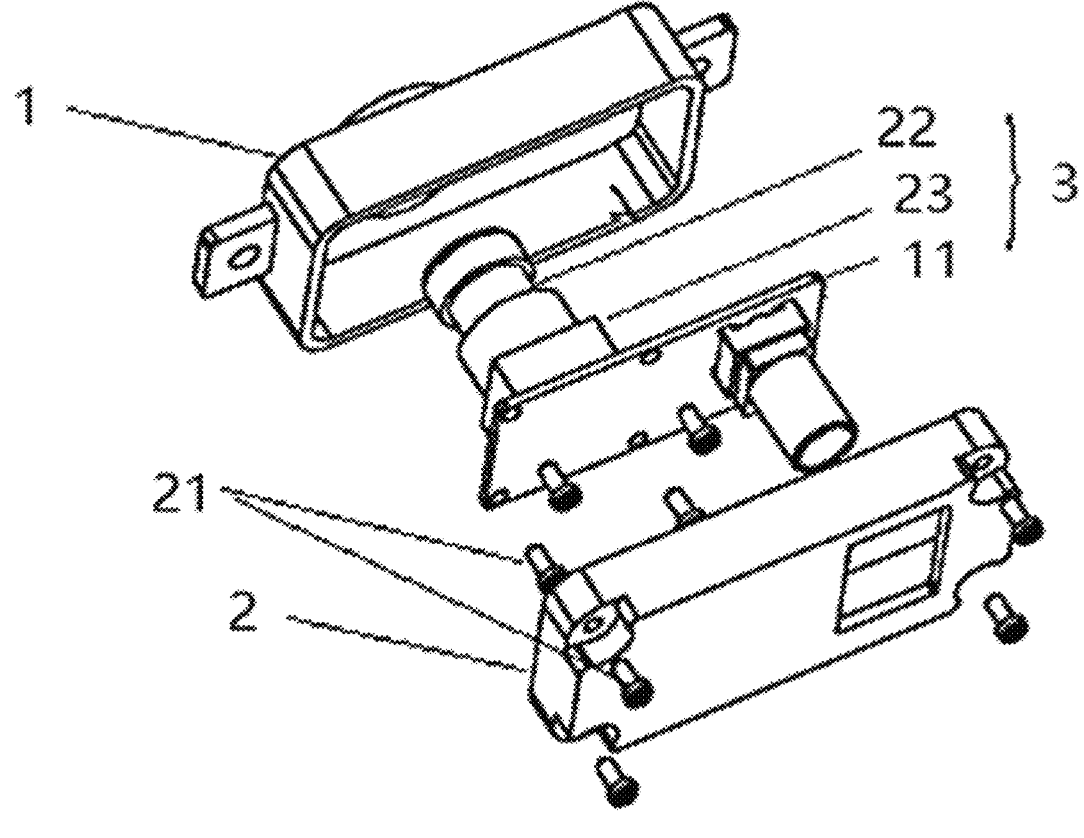
FIG. 1-1 is an exploded view schematically describing a traditional camera device in the prior art.

1. Front housing
2. Rear housing
3. Lens module
4. Nut
5. Spring pad
6. Through hole
6'. Elongate through hole
7. Lens barrel
8. Threads
9. Convex ring
10. Sensor board
11. Printed circuit board
12. Flexible flat cable
13. Adhesive
14. Sensor
15. Lens module block
16. Axial groove
17. Blocking spring
18. Guiding groove
19. Stop groove
20. Snap hook
21. Screw
22. Lens
23. Lens base
24. Adjusting jig

DETAILED DESCRIPTION OF THE EMBODIMENTS

Various exemplary embodiments of the present disclosure are described in detail with reference to the accompanying drawings. The description for exemplary embodiment is illustrative only and is in no way intended as any limitation on the present disclosure and the application or use of the present disclosure. The present disclosure can be realized in many different forms and is not limited to the specific embodiments described herein. These specific embodiments are provided to make the present disclosure thorough and complete and to fully convey the scope of the present disclosure to a person skilled in the art. It should be noted that the relative arrangement of parts and steps, compositions of materials, numerical expressions and values, etc., set forth in these embodiments should be interpreted as merely exemplary and not as limitations unless otherwise stated.

The terms "including" or "comprising" and similar terms in the present invention are intended to mean that the elements preceding the terms encompass the elements enumerated after the terms and does not exclude the possibility that other elements are also encompassed. In the present invention, the indicated orientation terms "front" and "rear" mean that along the optical axis of a lens barrel, a lens and a lens barrel are "in front" of a sensor, and the sensor is "behind" the lens and the lens barrel. In the present invention, the orientation or positional relationship indicated by terms "inner", "outer", "axial", "radial", "around", and so on are based on the orientation or positional relationship shown in the figures, and are only for the convenience of describing the present invention and simplifying the description, rather than indicating or implying that a device or an element should have a specific orientation, be configured and operated in a specific orientation, and therefore cannot be understood as a limitation to the present invention. When the absolute position of the described object is changed, this relative positional relationship may be changed accordingly. In the present invention, unless otherwise clearly specified and limited, terms such as "positioned", "connected", and "fixed" shall be understood in a general sense. For example, the "connected" may be a fixed connection, a detachable connection, or an integrated connection; or may be a mechanical connection or an electrical connection; or may be a direct connection, an indirect connection by using an intermediate medium, or an internal communication of two elements or an interaction of two elements. A person skilled in the art may understand specific meanings of the foregoing terms in the present invention according to a specific situation. The term "about" as used in the present invention has a meaning well known to a person skilled in the art, and preferably means that the term modifies a value within ranges of ±50%, ±40%, ±30%, ±20%, ±10%, ±5% or ±1% thereof.

Unless otherwise defined, meanings of all terms (including technical and scientific terms) used in the present disclosure are the same as those usually understood by a person skilled in the art to which the present application belongs. It should also be understood that terms defined in, for example, a general-purpose dictionary, should be understood to have a meaning consistent with their meaning in the context of the related art and should not be construed in an idealized or extremely formalized sense unless expressly defined as such herein.

A technique, the method, and an apparatus known to a person skilled in the art may not take as be discussed in detail, but where appropriate, the techniques, the method, and the apparatus should be considered as part of the specification.

In the following, the technical embodiments of the present invention will be more particularly described with reference to FIGS. 4 to 22.

Figures 1, 5:
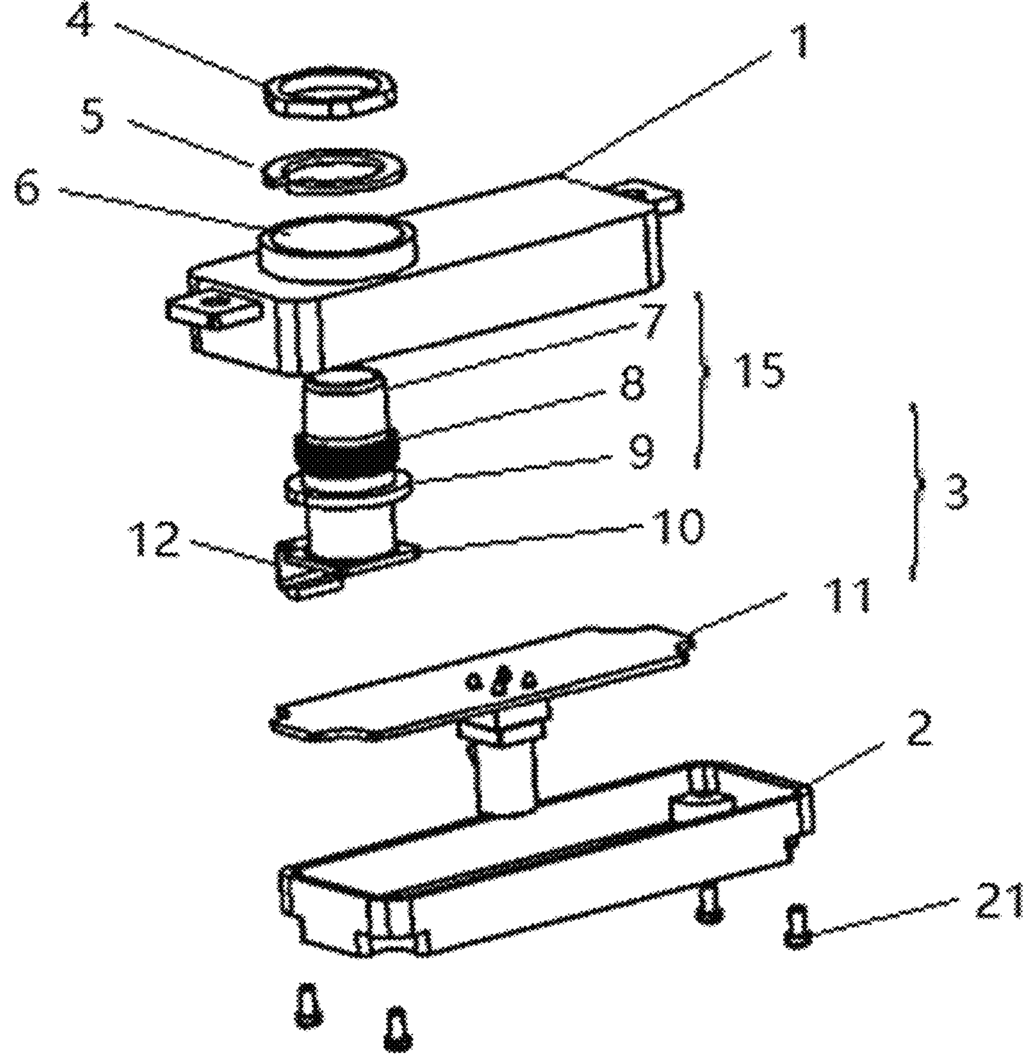
Figures 2, 5:
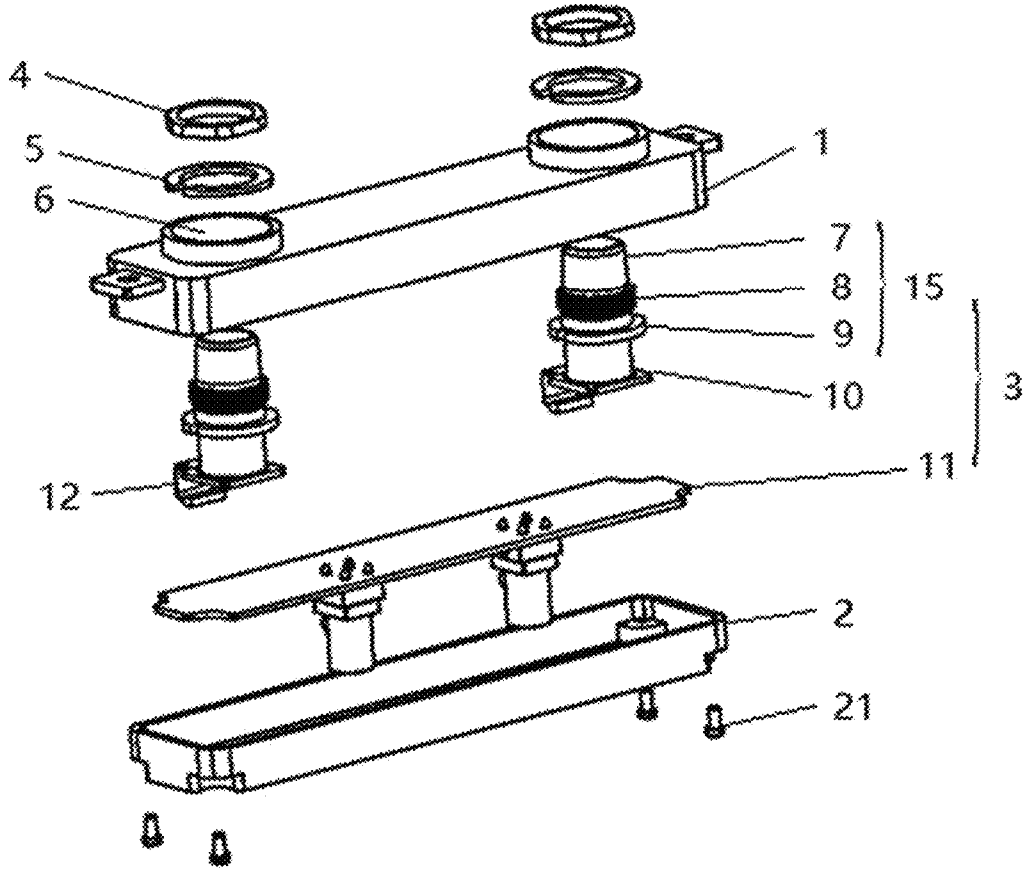
Figures 3, 5:
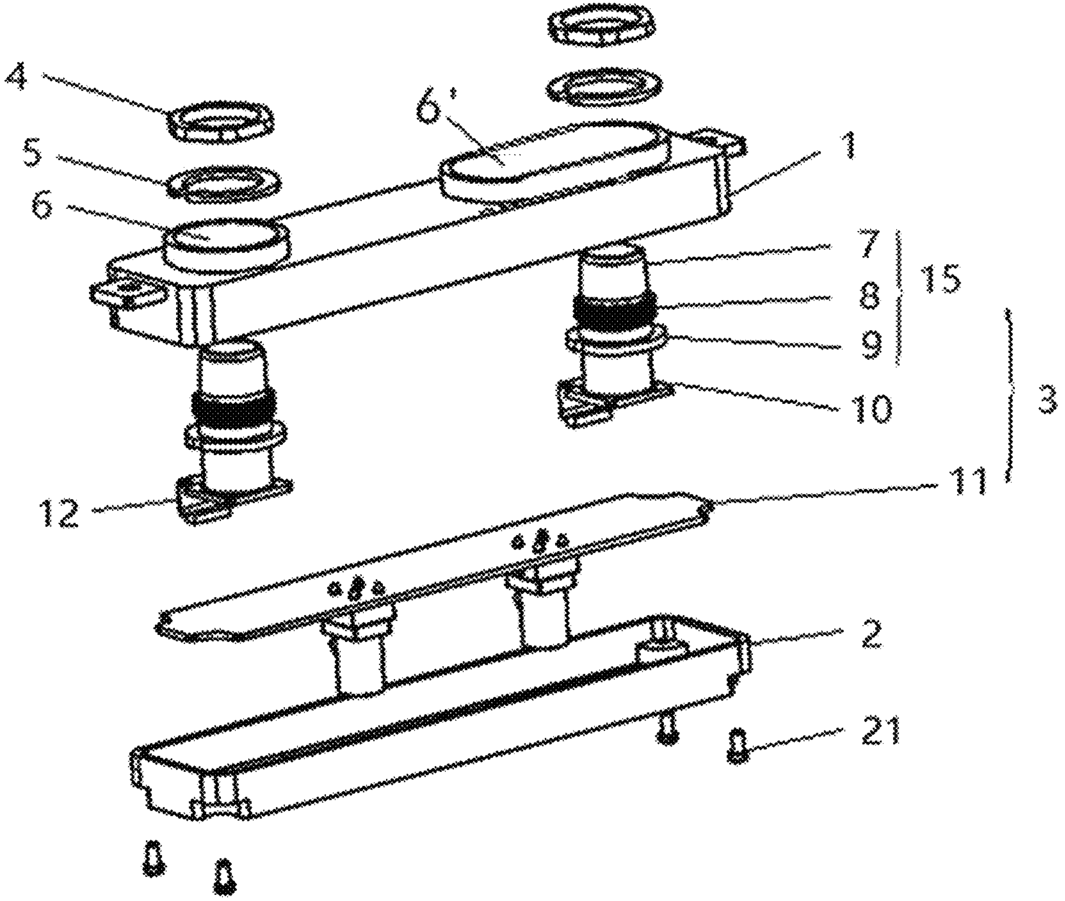

In a first aspect, the present invention relates to a camera device 100 (as shown in FIGS. 5-1), including a lens module 3, a front housing 1 and a rear housing 2. The front housing 1 has a through hole 6. The rear housing 2 is connected to the front housing 1 to form a cavity positioned between the front housing 1 and the rear housing 2, wherein the lens module 3 includes a lens module block 15, a sensor board 10 and a printed circuit board 11, and the camera device 100 also includes a fastening mechanism, wherein, the printed circuit board 11 is positioned inside the cavity and fixedly connected to the rear housing 2.

The lens module block 15 includes a lens barrel 7. The lens barrel 7 has a barrel-body front end and a barrel-body rear end. The lens barrel 7 passes through the through hole 6 so that the barrel-body front end is positioned outside the cavity. The barrel-body rear end is positioned inside the cavity.

The sensor board 10 is positioned inside the cavity, so that light passing through the lens barrel 7 can reach a sensor 14 on the sensor board 10. The sensor board 10 is further connected to the printed circuit board 11.

The fastening mechanism is configured to fix the lens module block 15 to the front housing 1.

Figures 1, 2:
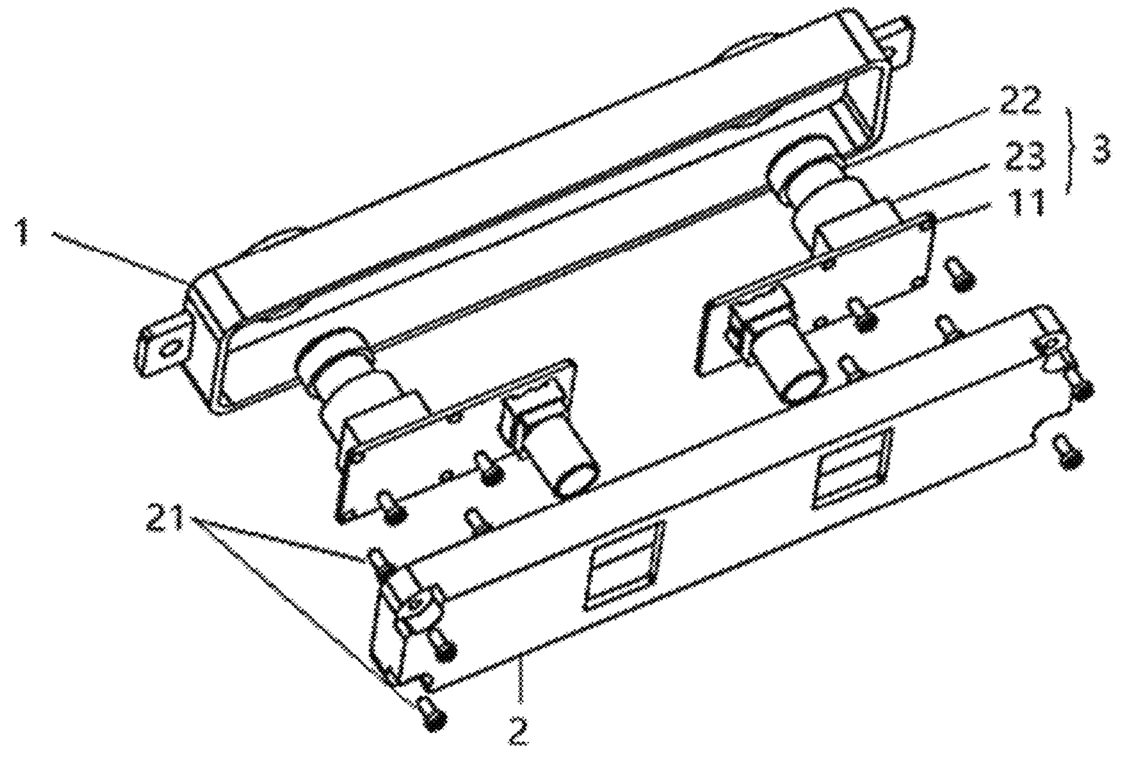
Figure 2:
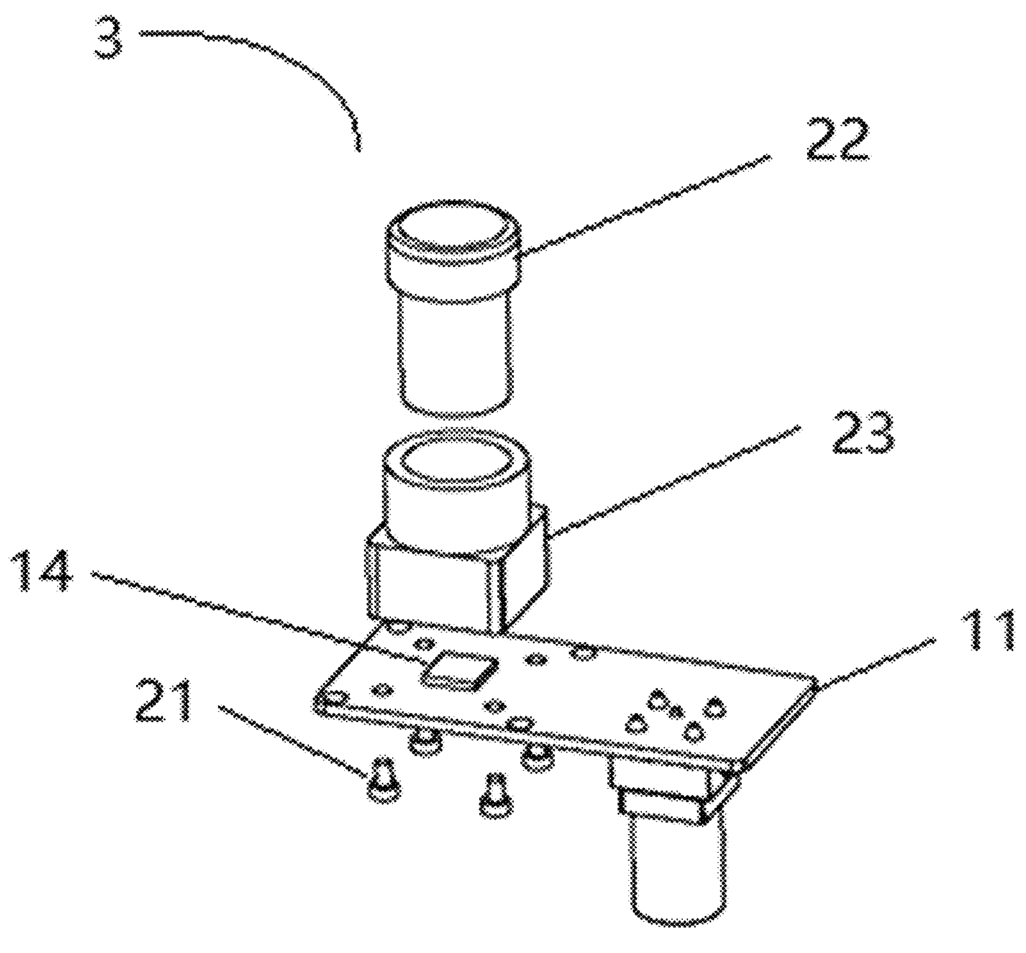

In a second aspect, the present invention relates to a camera device 200 with at least two ocular lenses (as shown in FIG. 5-2), including at least two lens module 3, a front housing 1, and a rear housing 2. The front housing 1 has a through hole 6. The rear housing 2 is connected to the front housing 1 to form a cavity positioned between the front housing 1 and the rear housing 2, wherein, the lens module 3 includes a lens module block 15, a sensor board 10 and a printed circuit board 11.

The camera device 200 further includes a fastening mechanism, wherein, the printed circuit board 11 is positioned inside the cavity.

The lens module block 15 includes a lens barrel 7. The lens barrel 7 has a barrel-body front end and a barrel-body rear end. The lens barrel 7 passes through the through hole 6 so that the barrel-body front end is positioned outside the cavity. The barrel-body rear end is positioned inside the cavity.

The sensor board 10 is positioned inside the cavity and fixedly connected to the lens barrel 7 so that light passing through the lens barrel 7 can reach a sensor 14 on the sensor board 10. The sensor board 10 is further connected to the printed circuit board 11.

The fastening mechanism is configured to fix the lens module block 15 to the front housing 1. The fastening structure also allows the lens module block 15 to be rotated about the optical axis of the lens barrel 7 before being fixed to the front housing 1.

Figures 1, 3:
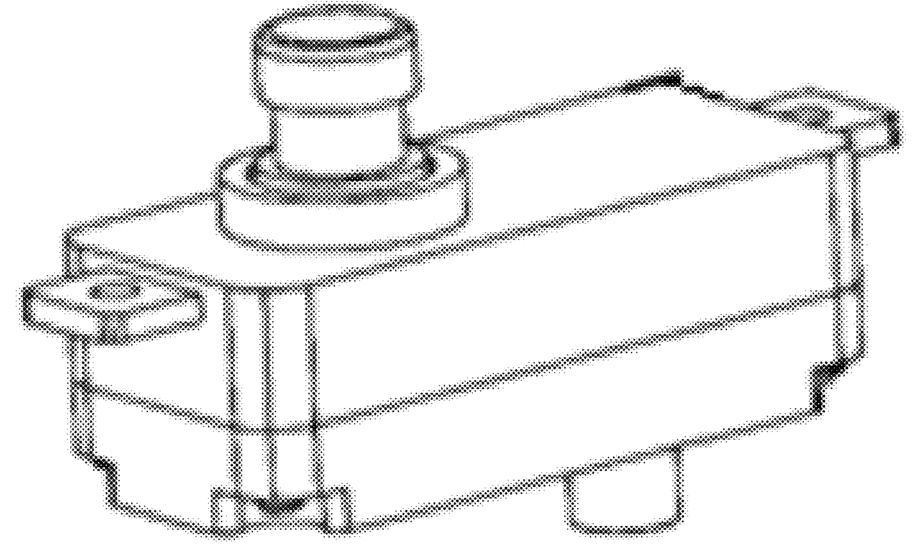
Figures 2, 3:
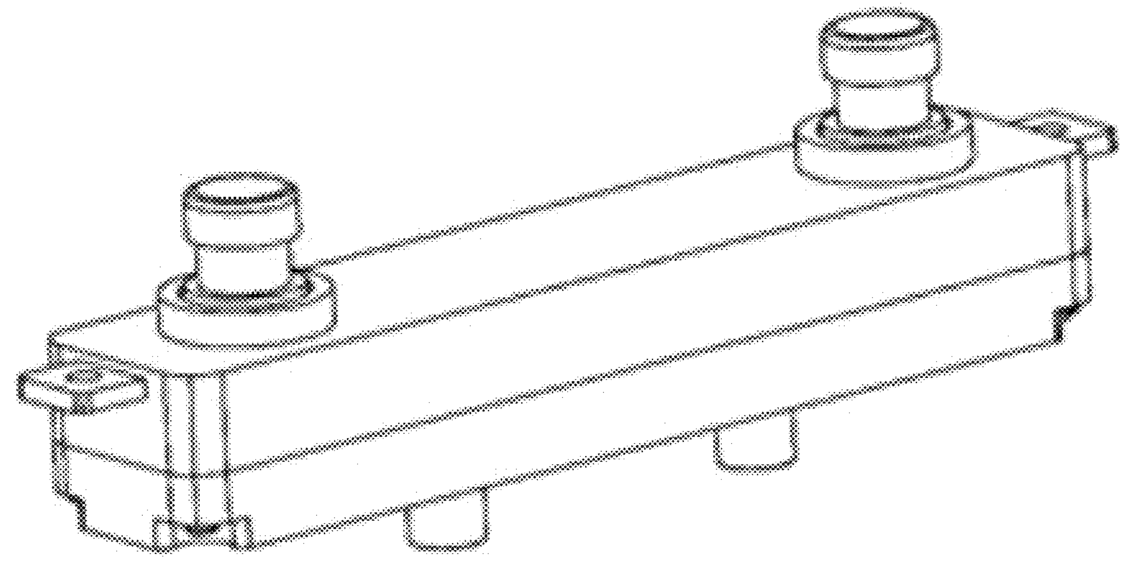
Figure 4:
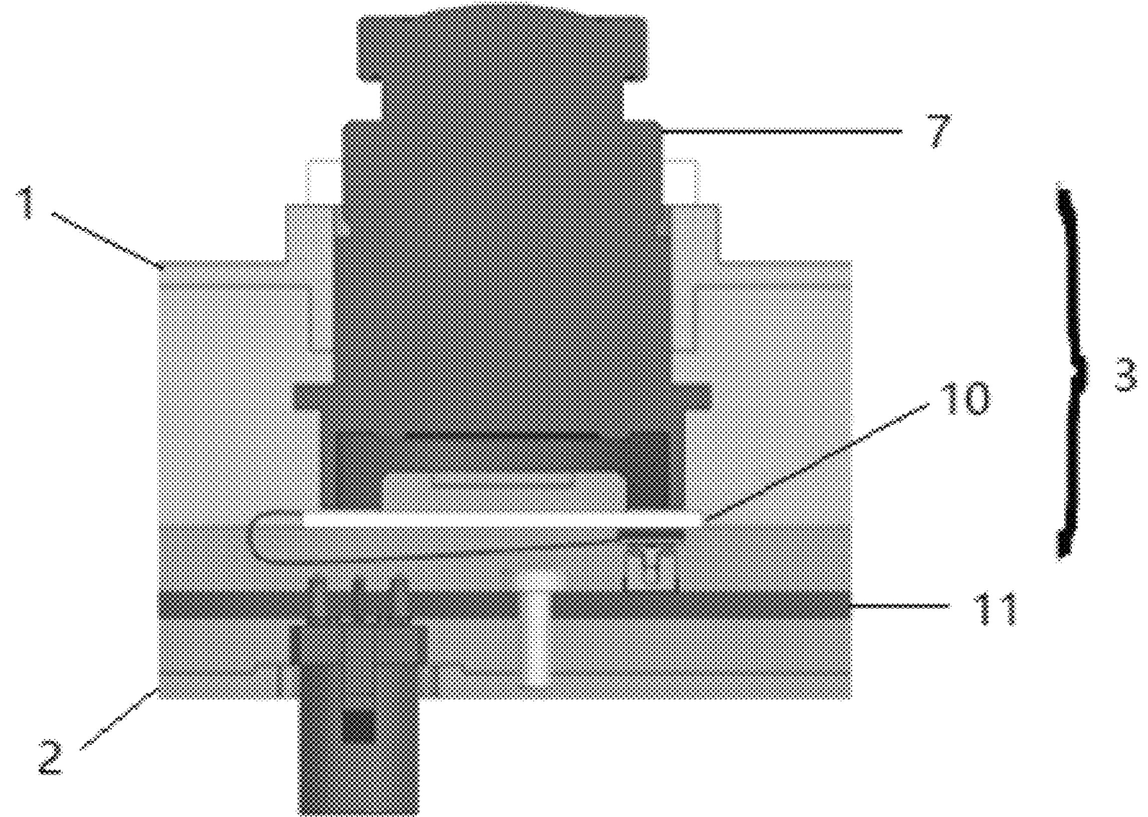
FIG. 4 is a side view schematically describing a single lens module included in a camera device or a camera device with at least two ocular lenses of the present invention.

In a third aspect, the present invention relates to a camera device 300 with at least two ocular lenses (as shown in FIG. 5-3), including at least two lens module 3, a front housing 1, and a rear housing 2. The front housing 1 has one or a plurality of through holes 6. The rear housing 2 is connected to the front housing 1 to form a cavity positioned between the front housing 1 and the rear housing 2.

The lens module 3 includes a lens module block 15, a sensor board 10 and a printed circuit board 11.

The camera device 300 further includes a fastening mechanism, wherein, the printed circuit board 11 is positioned inside the cavity.

The lens module block 15 includes a lens barrel 7. The lens barrel 7 has a barrel-body front end and a barrel-body rear end. The lens barrel 7 passes through the through hole 6 or 6' so that the barrel-body front end is positioned outside the cavity. The barrel-body rear end is positioned inside the cavity.

The sensor board 10 is positioned inside the cavity fixedly connected to the lens barrel 7 so that light passing through the lens barrel 7 can reach a sensor 14 on the sensor board 10. The sensor board 10 is further connected to the printed circuit board 11.

At least one of one or the plurality of through holes 6 or 6' is an elongate through hole 6'. At least one of the lens barrels 7 passes through at least one of the elongate through holes 6'.

The fastening mechanism is configured to fix the lens module block 15 to the front housing 1. The fastening mechanism configured to fix to the front housing the lens module block 15 in which the lens barrel 7 passes through the elongate through hole 6' further allows the lens module block 15 to be fixed to the front housing 1 at the different positions of the elongate through hole 6'.

A person skilled in the art can understand that in the camera device 100 of the first aspect as described above or in the camera device 200 or 300 with the at least two ocular lenses of the second or the third aspect, there is no particular limitation as to the forms of the front housing 1 and the rear housing 2 and the mode in which the front housing 1 and the rear housing 2 are connected, as long as the front housing 1 and the rear housing 2 are fixedly connected to each other to form a cavity positioned between the front housing 1 and the rear housing 2. In this context, the term "cavity" means a closed space. The boundary of the closed space is understood as including: the outer surfaces of the front housing 1 and the rear housing 2, as well as a surface defined by boundaries formed by the outer surfaces of the front housing 1 and the rear housing 2 and the sidewalls of any hole, passage, or gap on the front housing 1 and the rear housing 2. The space may be communicated with the outside world via the hole, the passage or the gap of any shape and size, etc., positioned on the front housing 1 and/or the rear housing 2. A person skilled in the art may consider that the front housing 1 and the rear housing 2 are cooperatively fixedly connected together by a variety of means such as one-piece molding, casting, welding, adhesive bonding, screw fixing, rivet fixing and/or bayonet fixing. Indeed, in the present invention, the front housing 1 and the rear housing 2 may even be understood as a first fixing bracket and a second fixing bracket that play respective roles, respectively, whereas an additional housing may be arranged outside the bracket. Further, there is no clear boundary between the front housing 1 and the rear housing 2. In a case where the front housing 1 and the rear housing 2 are considered as a single integral housing (e.g. in a case where the front housing 1 and the rear housing 2 are molded in one piece), the front housing 1 and the rear housing 2 may be considered as a relatively forward part and a relatively rearward part of the integral housing.

In the camera device 100 of the first aspect as described above or in the camera device 200 or 300 with the at least two ocular lenses of the second aspect or the third aspect, an additional through hole is optionally further arranged in the front housing 1 and/or the rear housing 2, in addition to the defined through hole 6 or 6'. The additional through hole can be used for example for a plurality of objectives, such as connection of the printed circuit board 11 to the outside world and signaling (the rear housing 2 has the additional through hole, as described in FIG. 4). Alternatively, the camera device 100 of the first aspect or the camera device 200 or 300 with the at least two ocular lenses of the second or the third aspect is fixed and mounted on a motorized vehicle, such as an automobile, which can also be realized by the additional through hole on the front housing 1 and/or rear housing 2 and/or an additional device positioned on the outer surface of the front housing 1 and/or rear housing 2 known to a person skilled in the art. The additional device is, for example, a protrusion positioned on the opposing sides of the front housing 1 as described in FIG. 1-1, 1-2, 3-1, 3-2, 8-1, 8-2 or 8-3.

In the camera device 100 of the first aspect as described above or the camera device 200 or 300 with the at least two ocular lenses of the second or the third aspect, the lens barrel 7 of the lens module block 15 is optionally configured to hold a lens. The sensor board 10 is positioned inside the cavity so that light transmitting through the optional lens and passing through the lens barrel 7 can be conveyed to reach the sensor 14 on the sensor board 10.

In the camera device 100 of the first aspect as described above, the sensor board 10 may be fixedly connected to the front housing 1 and/or the rear housing 2 and/or the printed circuit board 11 and/or the lens barrel 7 by any means known to a person skilled in the art. Preferably, the sensor board 10 is fixedly connected to the lens barrel 7.

In the camera device 200 or 300 with the at least two ocular lenses of the second aspect or the third aspect as described above, the sensor board 10 needs to be fixedly connected to the lens barrel 7.

The mode of fixation connection is not particularly limited, as long as the mode enables light transmitting through the optional lens and passing through the lens barrel 7 to reach the sensor 14 on the sensor board 10. Here, for example, it is contemplated that the fixed connection can be realized by a plurality of ways, such as a screw, a rivet, an adhesive, casting, welding, clasping, one-piece molding, or integrating together.

Figure 6:
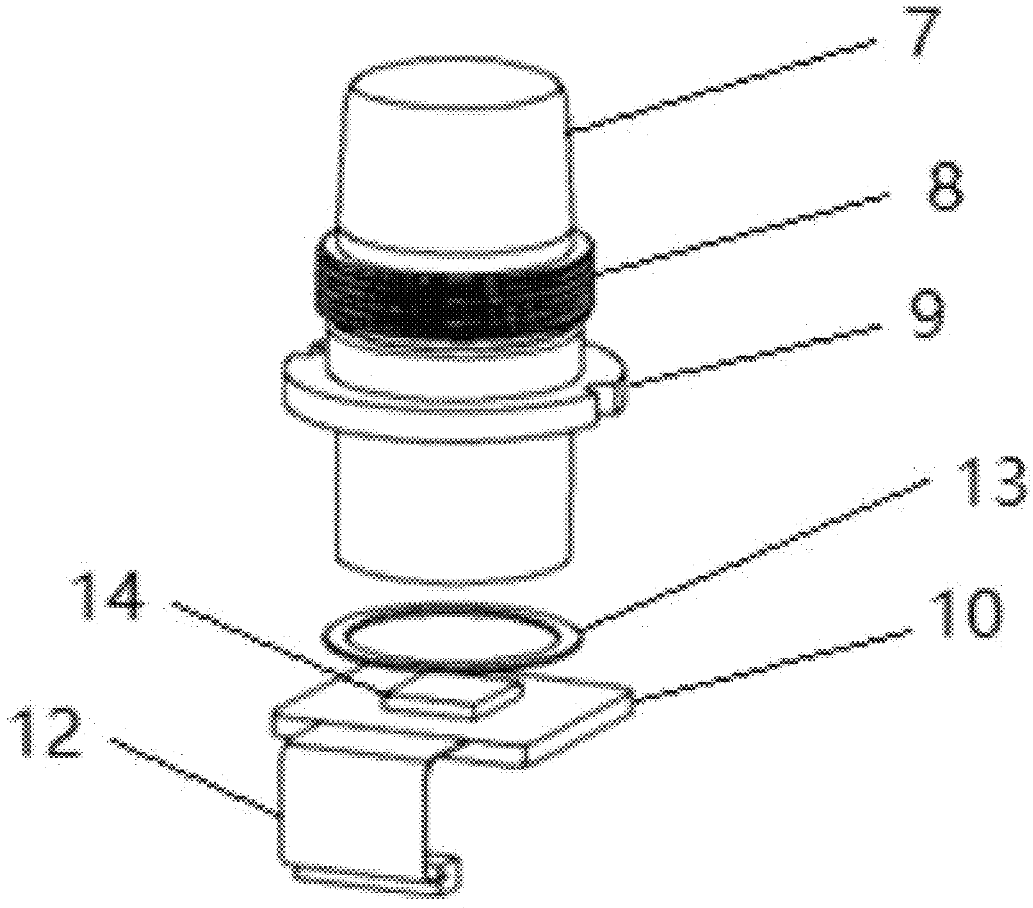
FIG. 6 is an exploded view schematically describing a single lens module block and sensor board included in a preferable camera device or a preferable camera device with at least two ocular lenses of the present invention as shown in FIG. 5-1, FIG. 5-2 or FIG. 5-3.
Figure 7:
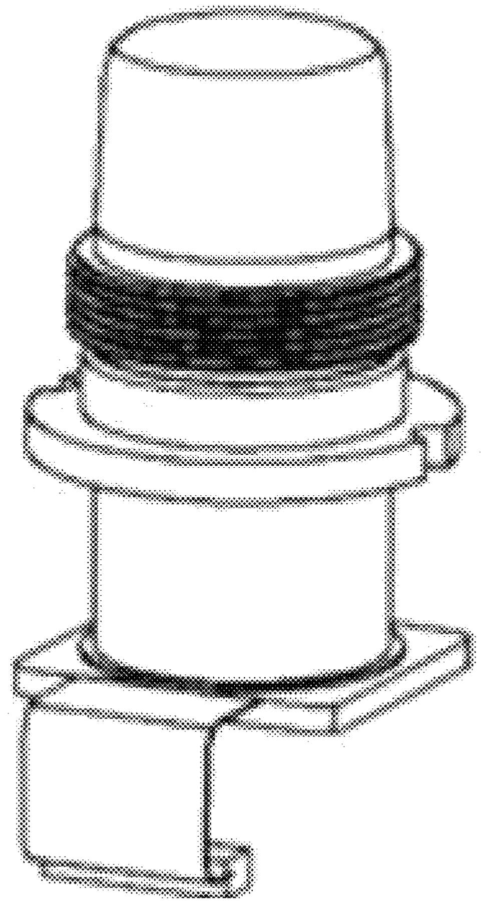
FIG. 7 is an assembly view schematically describing a single lens module block and sensor board assembled together as shown in FIG. 6.
Figures 1, 8:
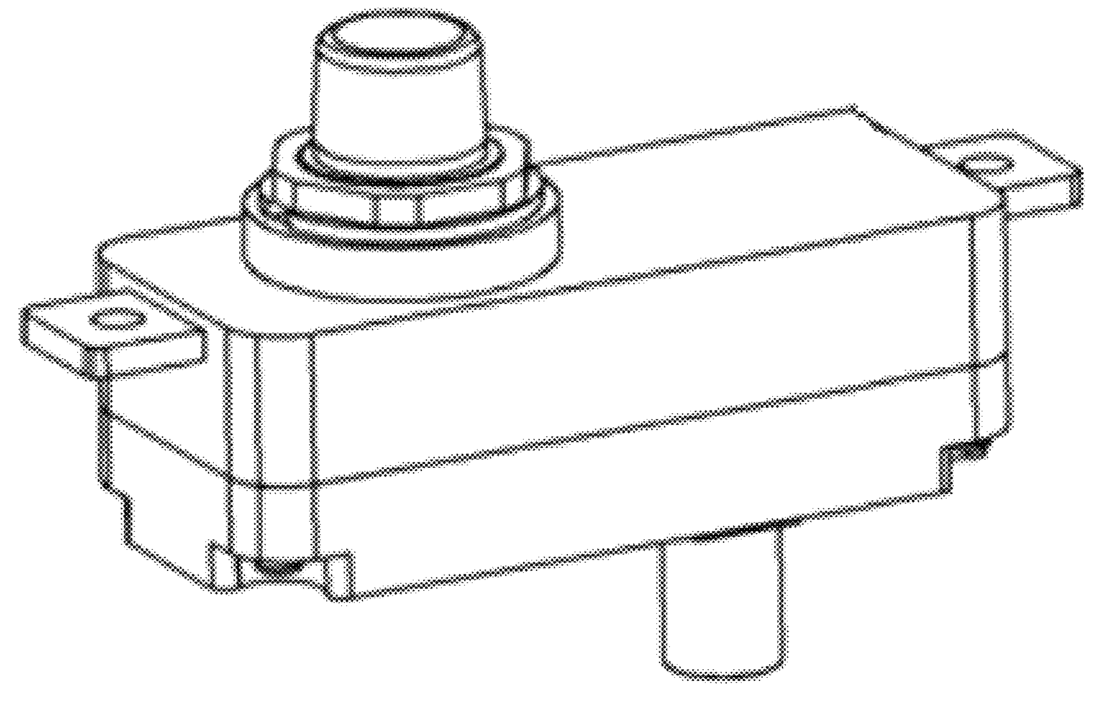
Figures 2, 8:
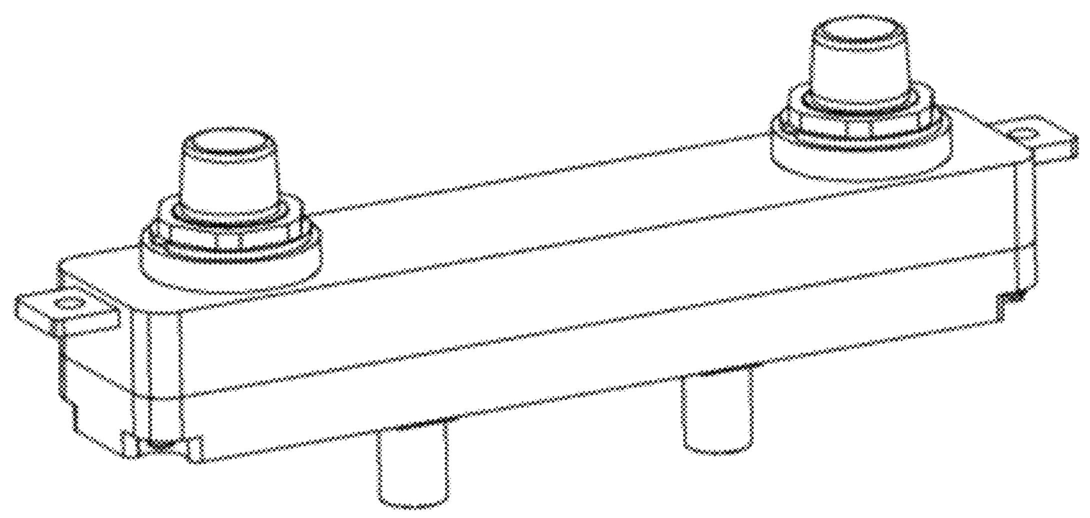
Figures 3, 8:
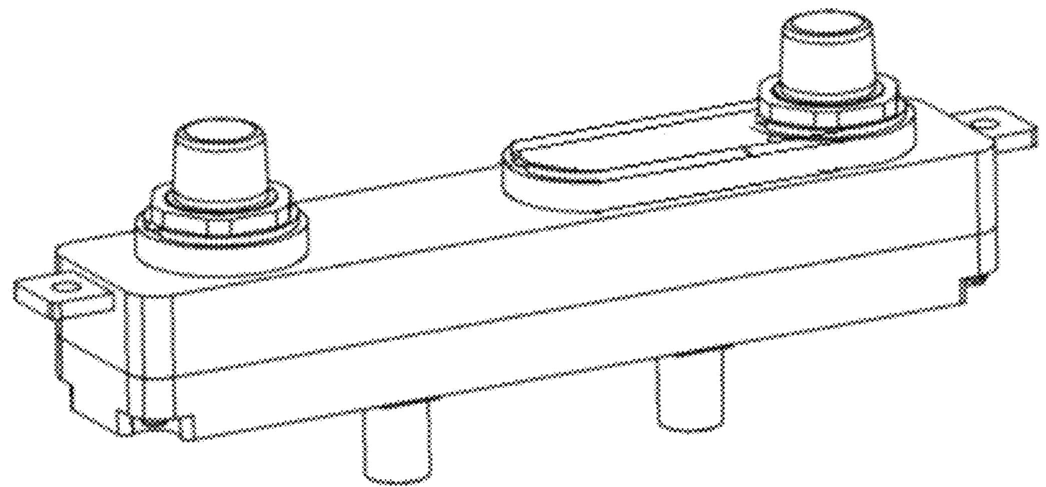

For example, in the preferable camera device 100 of the first aspect of the present invention or the camera device 200 or 300 with the at least two ocular lenses of the second or the third aspect, as shown in FIGS. 6 to 7, the lens barrel 7 may be fixedly connected to the sensor board 10 via an adhesive 13 to form a lens module block 15.

In the camera device 100 of the first aspect as described above or in the camera device 200 or 300 with the at least two ocular lenses of the second or the third aspect, the sensor 14 is a light sensor common in the art. The sensor 14 can receive a light signal from the lens barrel 7 and transform the light signal into an electrical signal while transmitting the transformed electrical signal to the printed circuit board 11.

In the camera device 100 of the first aspect as described above or in the camera device 200 or 300 with the at least two ocular lenses of the second or the third aspect, there is no particular limitation in the mode that the sensor board 10 is connected to the printed circuit board 11. For example, it is contemplated that the sensor board 10 is fixedly connected to the printed circuit board 11 together by a plurality of ways, such as a screw, a rivet, welding, clasping, and casting. It may even be contemplated that the sensor 14 is integrated into the printed circuit board 11 as one hardboard of the PCBA to realize the connection, as described in the background above. In this case, the sensor 14 and the printed circuit board 11 are integrated to obtain the hardboard of the PCBA.

In the camera device 100 of the first aspect as described above or in the camera device 200 or 300 with the at least two ocular lenses of the second or the third aspect, it is preferable that the printed circuit board 11 is fixedly connected to the rear housing 2.

In a case where the sensor board 10 is fixedly connected to the lens barrel 7 and the printed circuit board 11 is fixedly connected to the rear housing 2, it is further preferable that the sensor board 10 is connected to the printed circuit board 11 by a soft connection. For example, it is preferable that the sensor board 10 is connected to the printed circuit board 11 by a flexible flat cable 12, as shown in FIGS. 5-1, 5-2, 5-3, 6 and 7. It is also preferable that in this case, the sensor board 10 and/or the printed circuit board 11 form a rigid-flexible board with a flexible board between the sensor board 10 and the printed circuit board 11, thus realizing a soft connection between the sensor board and the printed circuit board (this case is not shown in the figures).

In the camera device 200 or 300 with the at least two ocular lenses of the second or the third aspect as described above, it is preferable that the plurality of sensor boards 10 of the at least two lens modules 15 may be connected not only to the plurality of printed circuit boards 11 via a soft connection (not shown in the figures), but also to one printed circuit board 11 via the soft connection (as described in FIGS. 5-1, 5-2 and 5-3).

In the camera device 100 of the first aspect as described above or in the camera device 200 or 300 with the at least two ocular lenses of the second or the third aspect, in a case where the printed circuit board 11 is connected to the rear housing 2, the mode of the connection is not particularly limited as long as the mode enables the printed circuit board 11 to be connected to the rear housing 2. The person skilled in the art may consider to achieve this objective by a plurality of ways such as the one-piece molding, the casting, the welding, the adhesive bonding, the screw fixing, the rivet fixing and/or the bayonet fixing, and even the flexible connection.

In the camera device 100 of the first aspect as described above or in the camera device 200 or 300 with the at least two ocular lenses of the second aspect or the third aspect, the cross-sectional shapes of the through hole 6 (except for the elongate through hole 6' in the third aspect) and of the lens barrel 7 are not particularly limited, as long as the cross-sectional shapes make it possible for the fastening mechanism to fix the lens module block 15 to the front housing 1. A cross-sectional shape may, for example, be a convex polygon, an approximate square polygon, an ellipse or a circle. The circle is particularly preferred.

Alternatively, in the camera device with the at least two ocular lenses 300 of the third aspect as described above, at least one of one or the plurality of through holes 6 or 6' is the elongate through hole 6'. At least one of the lens barrels 7 passes through at least one of the elongate through holes 6', as described in FIGS. 5-3, 8-3, 21 and 22. In this context, the term "elongated through hole" means that the through hole has an elongated cross-section perpendicular to the optical axis of the lens barrel 7. At least one of the lens barrels 7 can be fixed to the front housing 1 by a corresponding fastening mechanism at different positions of the elongate through hole 6', so that a lens pitch of the at least two camera modules of the camera device with the at least two ocular lenses 300 of the third aspect of the present invention can be easily adjusted.

Herein, the elongate shape may be in a plurality of forms such as an obround-shape or an approximate obround-shape. In a case where there is the plurality of elongate through holes 6', the respective elongate through holes 6' may have the same or different shapes. Further, the length of the elongate through hole 6' is not particularly limited and may be adjusted by a person skilled in the art according to an actual situation.

Figure 22:
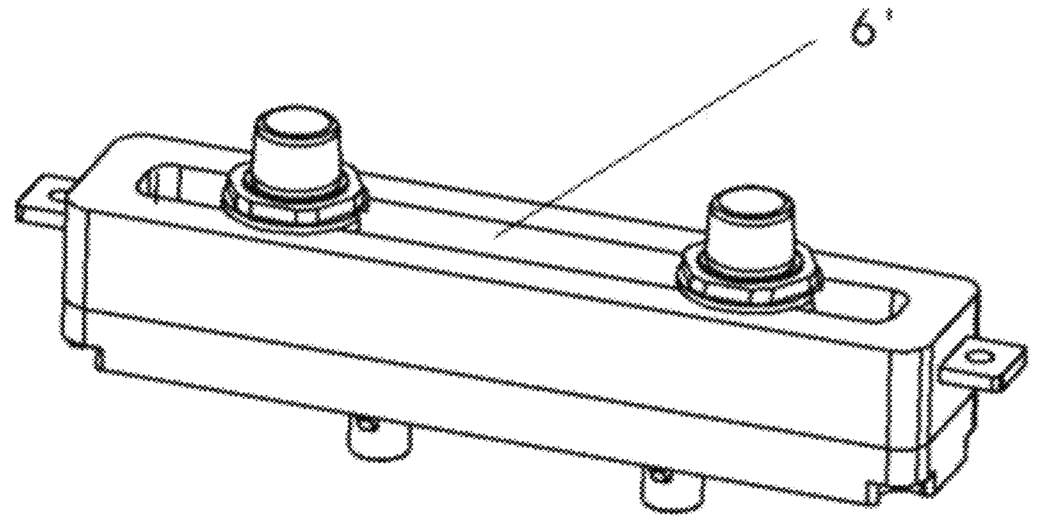
FIG. 22 is an assembly view schematically describing a further preferable camera device with at least two ocular lenses in a third aspect of the present invention.

Further, in the camera device 300 with the at least two ocular lenses of the third aspect as described above, it is also preferable that at least two of the lens barrels 7 pass through one of the elongate through holes 6' at the same time, as shown in FIG. 22. In this case, the lens pitch of the at least two camera modules of the camera device 300 with at least two ocular lenses of the third aspect of the present invention can be conveniently adjusted over a wider range, greatly facilitating the need to, for example, adjust the ranging accuracy and the like in different situations.

In the camera device 100 of the first aspect as described above or in the camera device 200 or 300 with the at least two ocular lenses of the second aspect or the third aspect, a ratio of the lengths of the barrel-body front end and the barrel-body rear end of the lens barrel 7 is not particularly limited. However, preferably, a boundary between the barrel-body front end and the barrel-body rear end is made so that, in the state of use, a difference between the weight of the lens module block 15 in the outer part of the cavity and the weight of the lens module block 15 in the inner part of the cavity is small (e.g. the difference of <about 200%, preferably the difference of <about 100%, more preferably the difference of <about 50%, most preferably the difference of <about 20%), which results in a relatively small amplitude of vibration of the lens module block 15 during the travel of the motorized vehicle.

In the camera device 100 of the first aspect as described above or the camera device 200 or 300 with the at least two ocular lenses of the second or the third aspect, the lens module block 15 may be a split-type lens module block (the lens module block consisting of a plurality of assemblies fixedly bonded together) or a one-piece lens module block, but preferably the one-piece lens module block. In a case where the lens module block 15 is the one-piece lens module block, the lens barrel 7 is integrally molded. The one-piece lens module block makes the above advantages of the present invention more prominent.

In the camera device 100 of the first aspect as described above or in the camera device 200 or 300 with the at least two ocular lenses of the second aspect or the third aspect, the fastening mechanism serves to fix the head of the lens module block 15 to the front housing 1.

In addition, in the camera device 200 or 300 with the at least two ocular lenses of the second aspect or the third aspect as described above, the fastening structure further allows the lens module block 15 to be rotated around the optical axis of the lens barrel 7 before being fixed to the front housing 1.

In particular, in the camera device with the at least two ocular lenses 300 of the third aspect as described above, the fastening mechanism for fixing to the front housing 1 the lens module block 15 in which the lens barrel 7 passes through the elongate through hole 6' further allows the lens module block 15 to be fixed to the front housing 1 at different positions of the elongate through hole 6'.

A person skilled in the art can recognize that fastening mechanisms including, but not limited to, the following modes, can achieve these objectives:

Mode 1 (as shown in FIGS. 5-1, 5-2, 5-3, 6, 7, 8-1, 8-2 and 8-3): the fastening mechanism includes the nut 4. In this case, the lens barrel 7 has a convex ring 9 extending outwardly in the radial direction of the lens barrel at the outer periphery of the barrel-body rear end. The lens barrel 7 also has threads 8 formed on the outer periphery of the barrel-body front end capable of cooperating with the nut 4. The nut 4 has a maximum outer diameter greater than the inner diameter of the through hole 6. The convex ring 9 has a maximum outer diameter greater than the inner diameter of the through hole 6. The nut 4 cooperates with the threads 8 and clamps and fixes the lens barrel 7 to the front housing 1 via the convex ring 9 positioned at the barrel-body rear end, so that the lens module block 15 is fixed to the front housing 1, thereby finally forming the preferable camera device 100 of the first aspect of the present invention as shown in FIGS. 8-1, 8-2, and 8-3, and the camera device 200 or 300 with the at least two ocular lenses.

Figure 19:
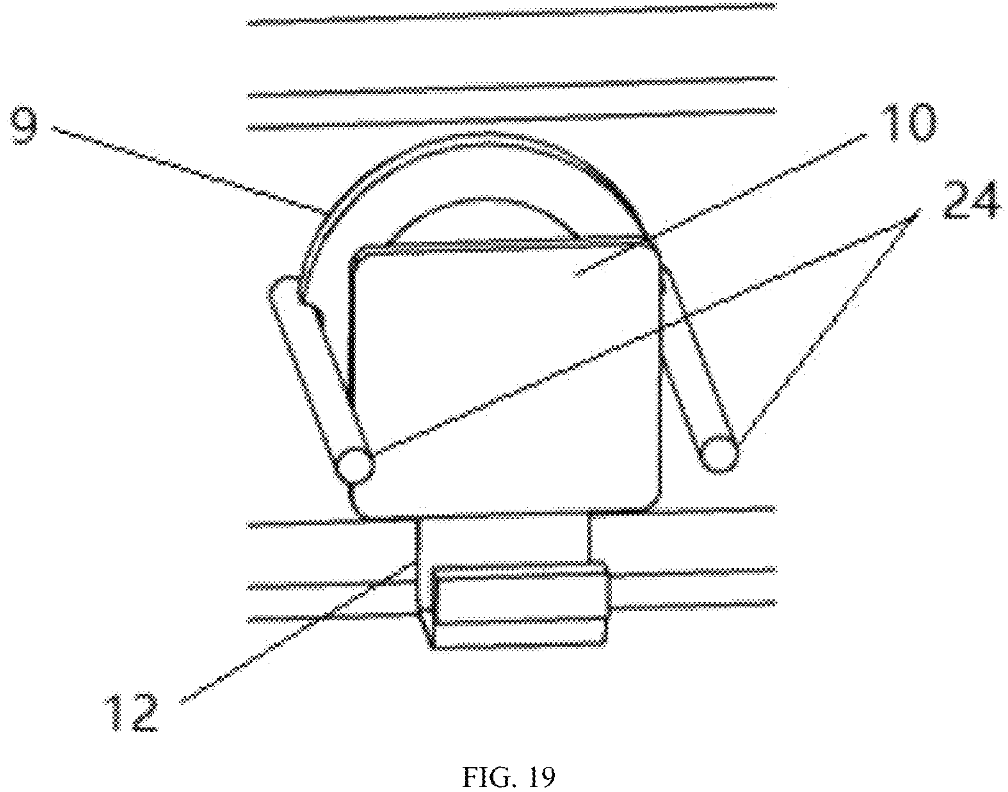
FIG. 19 is a schematic view schematically describing the relationship of an adjusting jig as well as a single lens module block and a sensor board included in a preferable camera device with at least two ocular lenses of the present invention.
Figure 20:
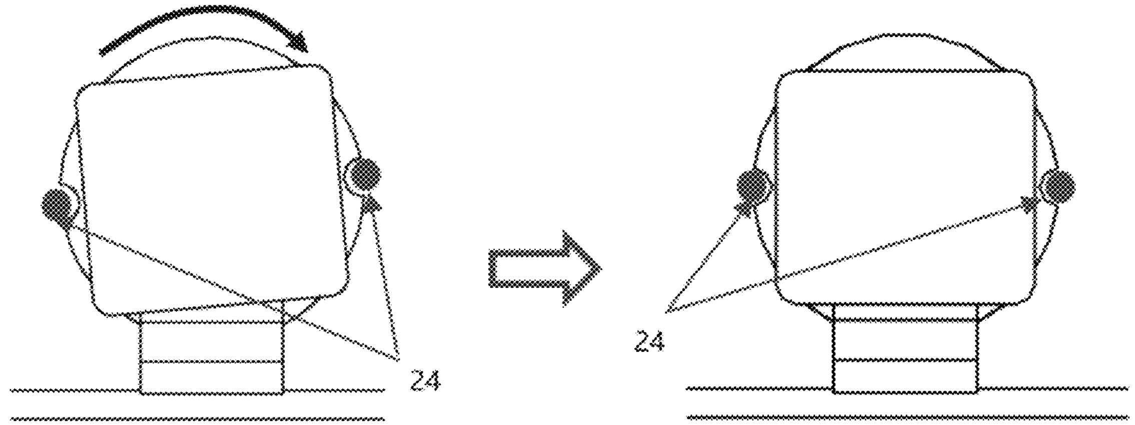
FIG. 20 is a schematic view schematically describing how an adjusting jig as shown in FIG. 19 adjusts the mounting angle of a single lens module block and a sensor board.
Figure 21:
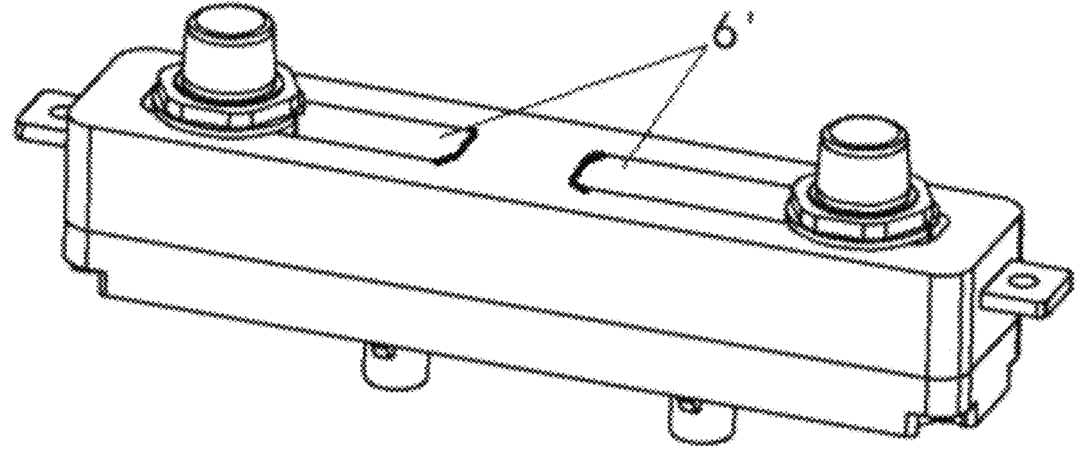
FIG. 21 is an assembly view schematically describing a preferable camera device with at least two ocular lenses in a third aspect of the present invention.

In a case of Mode 1, in the camera device 200 or 300 with the at least two ocular lenses of the second aspect or the third aspect of the present invention, the convex ring 9 preferably has a pit, a perforation hole or a projection (as shown in FIGS. 5-2, 5-3, 6, 7, 19 and 20) on a surface facing the inner part of the cavity, so that with the pit, the perforation hole or the projection, the lens barrel 7 at an inappropriate mounting angle (as shown in the figure on the left-hand view in FIG. 20) is rotated around the optical axis of the lens barrel 7 (in a direction indicated by a solid arrow on the left-hand view in FIG. 20) by using an adjusting jig 24 or manually so as to adjust accordingly the mounting angle of the sensor board 10 fixedly connected to the lens barrel 7 (as shown in the right-hand view in FIG. 20).

Figure 9:
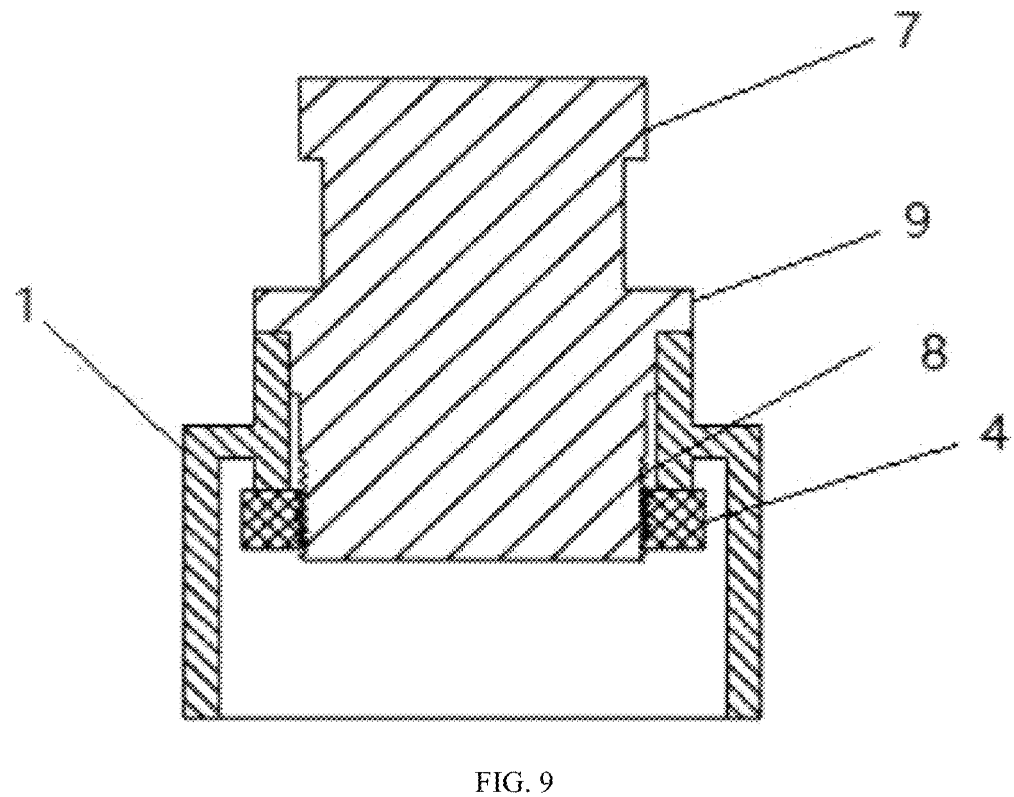
FIG. 9 is a side view schematically describing a single lens module block and a nut fastening mechanism included in another preferable camera device or a camera device with at least two ocular lenses of the present invention.

Mode 2 (as shown in FIG. 9): Mode 2 is similar to Mode 1, the fastening mechanism includes a nut 4. However, in this case, the lens barrel 7 has a convex ring 9 extending outwardly in the radial direction of the lens barrel at the outer periphery of the barrel-body front end. The lens barrel 7 also has threads 8 formed on the outer periphery of the barrel-body rear end capable of cooperating with the nut 4. The nut 4 has a maximum outer diameter greater than the inner diameter of the through hole 6 (the reference number of the through hole 6 is not indicated in FIG. 9). The convex ring 9 has the maximum diameter greater than the inner diameter of the through hole 6. The nut 4 cooperates with the threads 8 and clamps and fixes the lens barrel 7 to the front housing 1 via the convex ring 9 positioned at the barrel-body front end, so that the lens module block 15 is fixed to the front housing 1.

In a case of Mode 2, it is additionally preferable that the nut 4 has a pit, a perforation hole or a projection on a surface facing the inner part of the cavity, so that with the pit, the perforation hole or the projection, the nut is cooperatively screwed onto the threads of the barrel-body rear end of the lens barrel 7 by using the adjusting jig or manually (such a case is not shown in the figures).

In a case of Mode 2, in the camera device 200 or 300 with the at least two ocular lenses of the second aspect or the third aspect of the present invention, being similar to Mode 1, the convex ring 9 preferably has the pit, the perforation hole or the projection on the surface facing the inner part of the cavity, so that with the pit, the perforation hole or the projection, the lens barrel 7 at the inappropriate mounting angle is rotated around the optical axis of the lens barrel 7 by using the adjusting jig or manually so as to adjust accordingly the mounting angle of the sensor board 10 fixedly connected to the lens barrel 7 (this case is not shown in the figures).

In Mode 1 or 2, the fastening mechanism preferably further includes a spring pad 5 (the spring pad is shown in FIGS. 5-1, 5-2 and 5-3, not shown in FIG. 9), the spring pad 5 may be positioned between the nut 4 and the front housing 1 and/or may be positioned between the convex ring 9 and the front housing 1. The spring pad 5 serves to cooperate with the nut 4 so that the lens barrel 7 can be more stably fixed to the front housing 1.

In Mode 1 or 2, it is preferable that the threads 8 are not limited to being arranged on the barrel-body front end or the barrel-body rear end, but is arranged continuously on the barrel-body front end and the barrel-body rear end until reaching the convex ring 9, so that the nut 4 clamps and fixes the lens barrel 7 tightly to the front housing 1 during installation.

Figure 12:
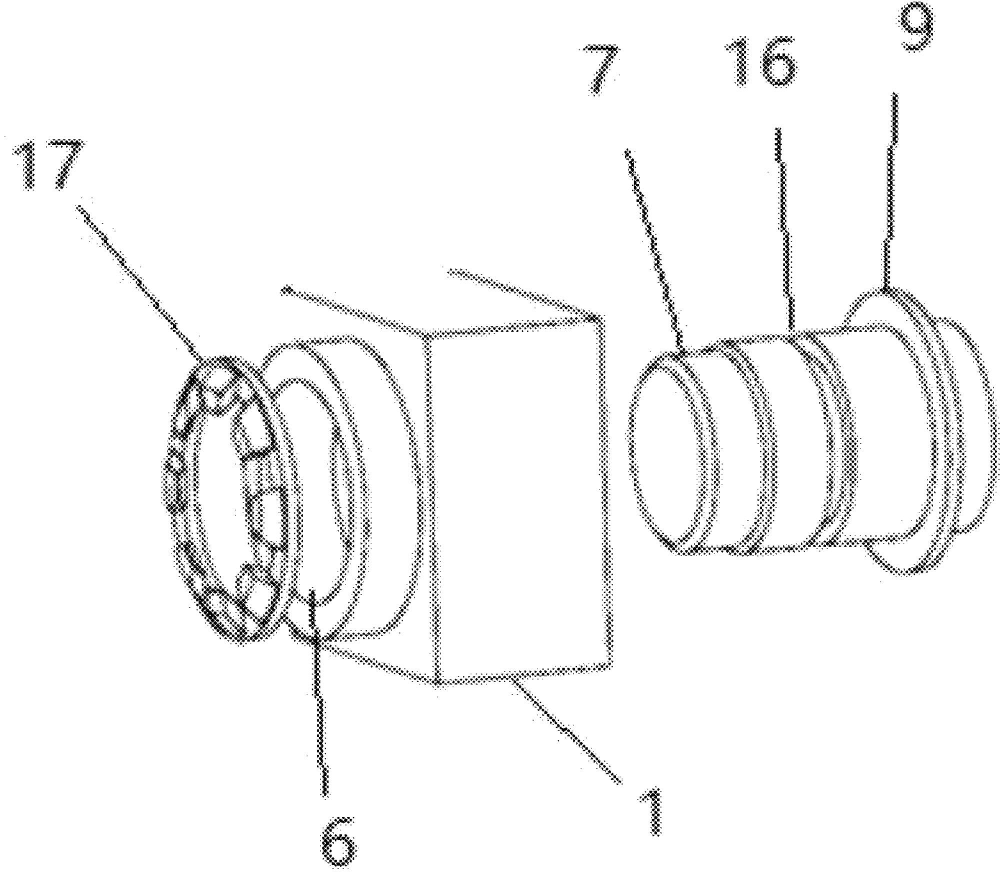
FIG. 12 is an exploded view schematically describing a single lens module block and a fastening mechanism of a blocking spring included in a preferable camera device or a camera device with at least two ocular lenses of the present invention.
Figure 13:
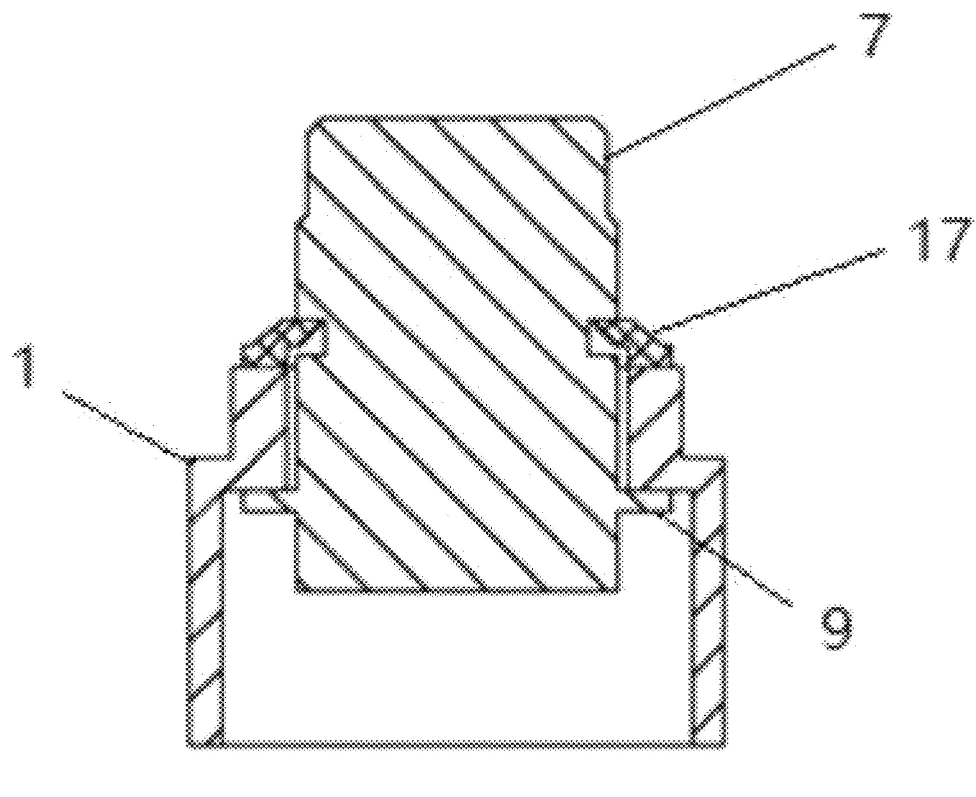
FIG. 13 is a side view schematically describing a single lens module block and a fastening mechanism of a blocking spring as shown in FIG. 12.
Figure 14:
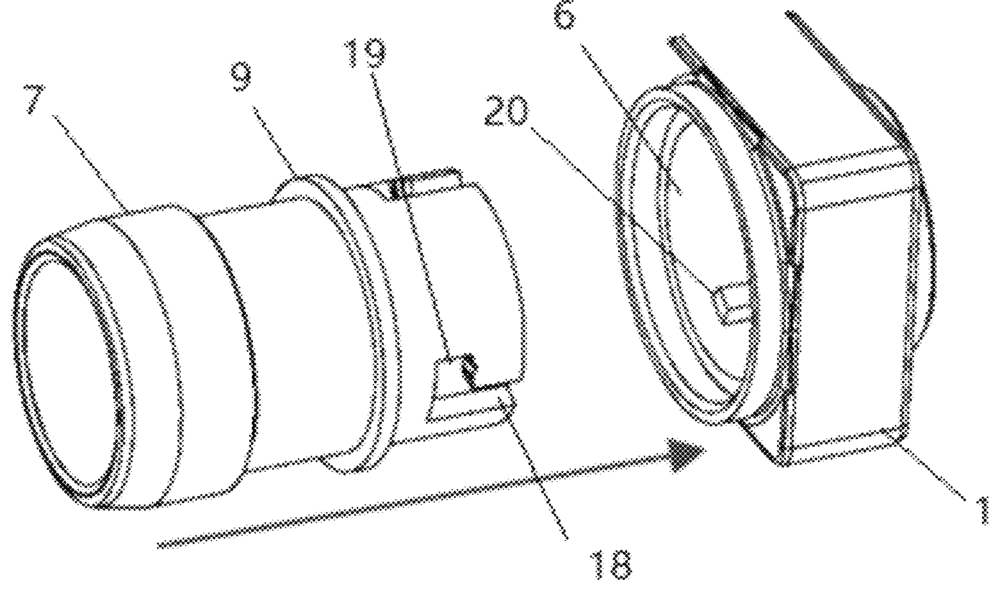
FIG. 14 is an exploded view schematically describing a single lens module block and a locking structure included in yet another preferable camera device or a camera device with at least ocular lenses of the present invention.
Figure 15:
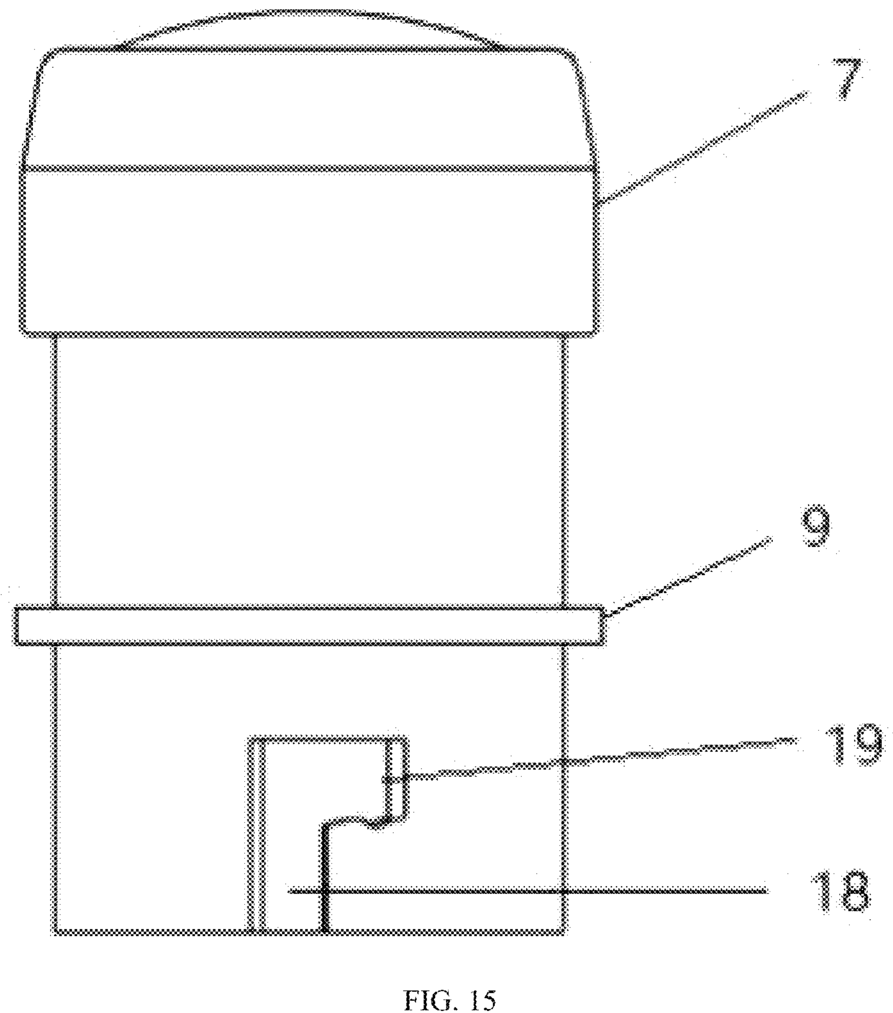
FIG. 15 is a side view schematically describing a single lens module block as shown in FIG. 14.

Mode 3 (as shown in FIGS. 12 and 13): the fastening mechanism includes a blocking spring 17, preferably a disc spring, more preferably a diaphragm spring. In this case, the lens barrel 7 has the convex ring 9 extending outwardly in the radial direction of the lens barrel at the outer periphery of the barrel-body rear end. The lens barrel 7 also has an axial groove 16 formed on the outer periphery of the barrel-body front end capable of cooperating with the blocking spring 17. The blocking spring 17 has a maximum outer diameter greater than the inner diameter of the through hole 6. The convex ring 9 has a maximum outer diameter greater than the inner diameter of the through hole 6. The blocking spring 17 cooperates with the axial groove 16 and clamps and fixes the lens barrel 7 to the front housing 1 via the convex ring 9 positioned at the barrel-body front end, so that the lens module block 15 is fixed to the front housing 1.

In a case of the Mode 3, in the camera device 200 or 300 with the at least two ocular lenses of the second aspect or the third aspect of the present invention, the convex ring 9 preferably has the pit, the perforation hole or the projection (as shown in FIGS. 19 and 20) on the surface facing the inner part of the cavity, so that with the pit, the perforation hole or the projection, the lens barrel 7 at the inappropriate mounting angle (as shown in the figure on the left-hand view in FIG. 20) is rotated around the optical axis of the lens barrel 7 (in a direction indicated by a solid arrow on the left-hand view in FIG. 20) by using the adjusting jig 24 or manually so as to adjust accordingly the mounting angle of the sensor board 10 fixedly connected to the lens barrel 7 (as shown in the right-hand view in FIG. 20).

Figure 10:
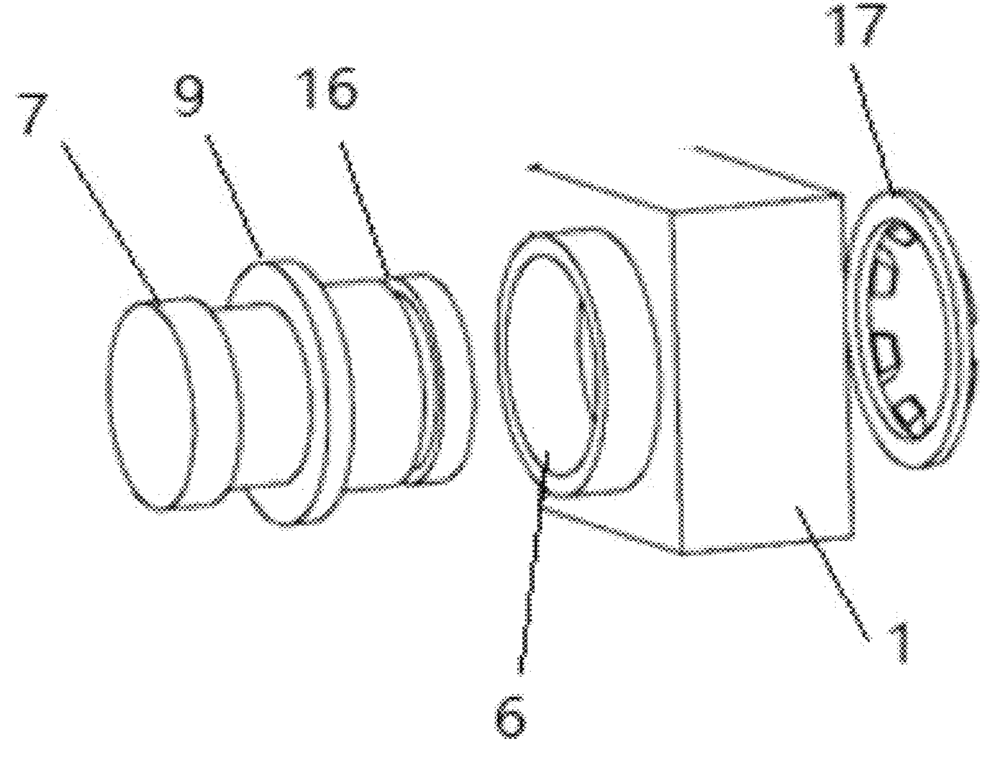
FIG. 10 is an exploded view schematically describing a single lens module block and a fastening mechanism of a blocking spring included in yet another preferable camera device or a camera device with at least ocular lenses of the present invention.
Figure 11:
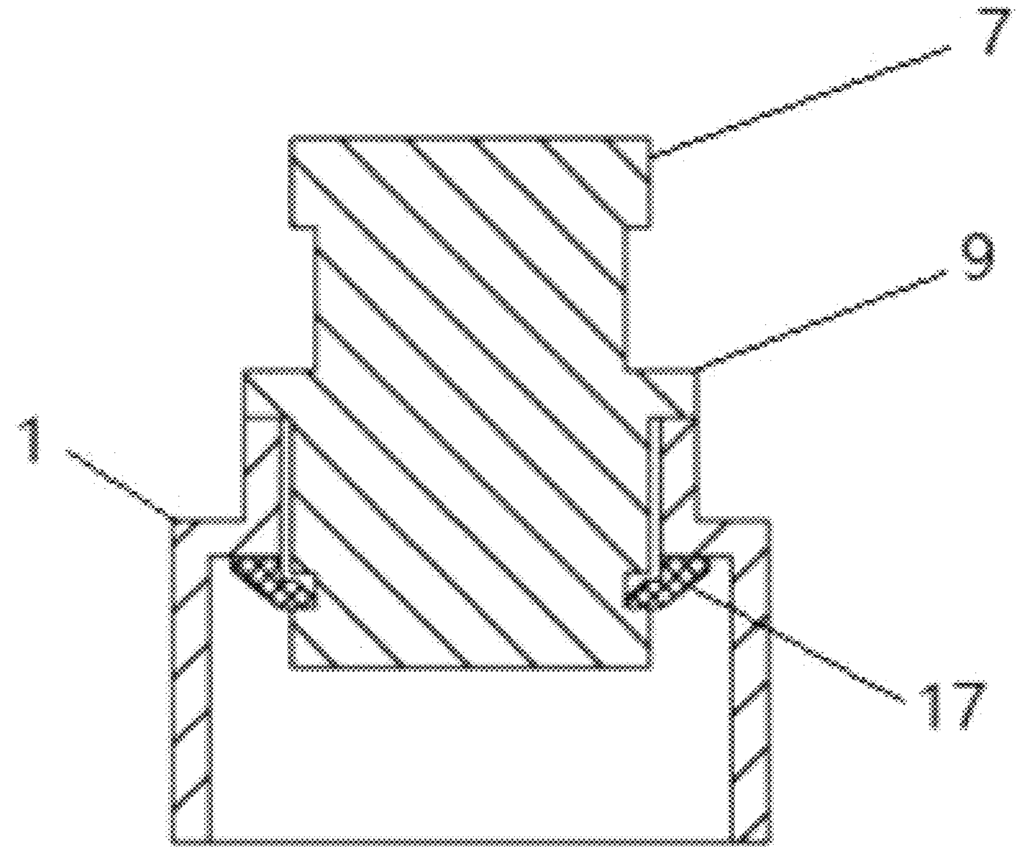
FIG. 11 is a side view schematically describing a single lens module block and a fastening mechanism of a blocking spring as shown in FIG. 10.

Mode 4 (as shown in FIGS. 10 and 11): being similar to Mode 3, the fastening mechanism includes the blocking spring 17, preferably a disc spring, more preferably the diaphragm spring. In this case, the lens barrel 7 has the convex ring 9 extending outwardly in the radial direction of the lens barrel at the outer periphery of the barrel-body front end. The lens barrel 7 also has the axial groove 16 formed on the outer periphery of the barrel-body rear end capable of cooperating with the blocking spring 17. The blocking spring 17 has a maximum outer diameter greater than the inner diameter of the through hole 6. The convex ring 9 has a maximum outer diameter greater than the inner diameter of the through hole 6. The blocking spring 17 cooperates with the axial groove 16 and clamps and fixes the lens barrel 7 to the front housing 1 via the convex ring 9 positioned at the barrel-body front end, so that the lens module block 15 is fixed to the front housing 1.

In a case of Mode 4, in the camera device 200 or 300 with the at least two ocular lenses of the second aspect or the third aspect of the present invention, being similar to the mode 3, the convex ring 9 preferably has the pit, the perforation hole or the projection on the surface facing the inner part of the cavity, so that with the pit, the perforation hole or the projection, the lens barrel 7 at the inappropriate mounting angle is rotated around the optical axis of the lens barrel 7 by using the adjusting jig 24 or manually so as to adjust accordingly the mounting angle of the sensor board 10 fixedly connected to the lens barrel 7.

Being similar to Modes 1 and 2, in Modes 3 or 4, the fastening mechanism preferably further includes the spring pad 5 (the spring pad is not shown in FIGS. 10 to 13). The spring pad 5 may be positioned between the blocking spring 17 (preferably a disc spring, more preferably the diaphragm spring) and the front housing 1 and/or may be positioned between the convex ring 9 and the front housing 1. The spring pad 5 serves to cooperate with the blocking spring 17 (preferably a disc spring, more preferably the diaphragm spring) so that the lens barrel 7 can be more stably fixed to the front housing 1.

Figure 16:
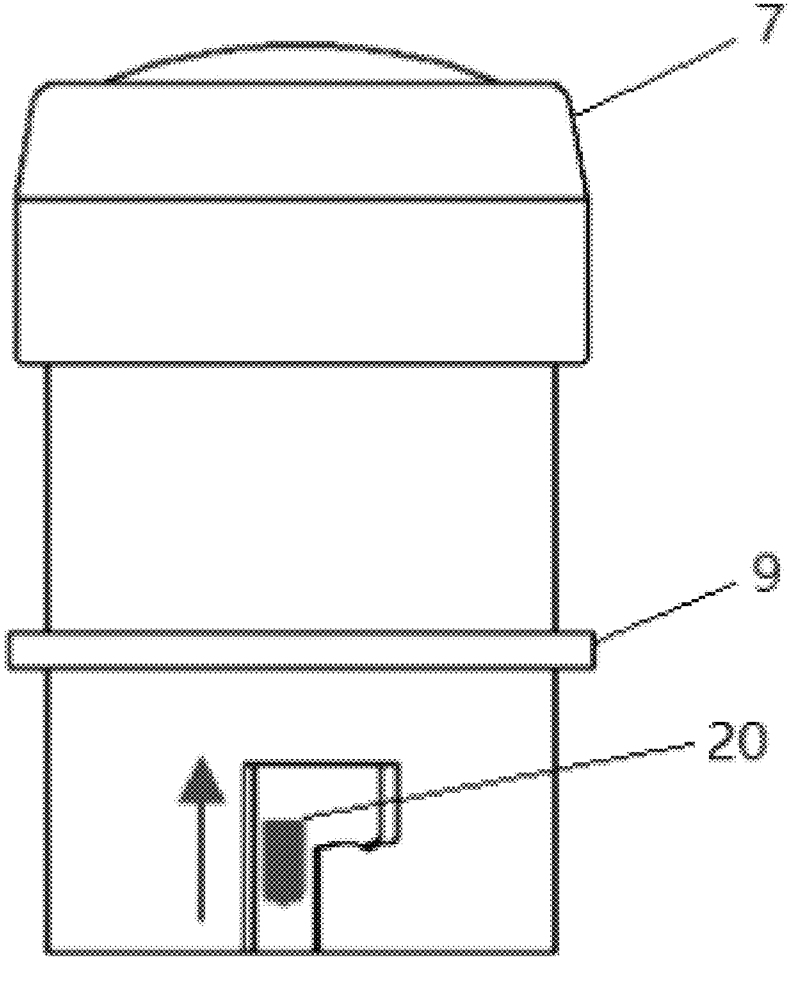
FIG. 16 is a side view schematically describing a single lens module block and a locking structure in an unlocked state as shown in FIG. 14.
Figure 17:
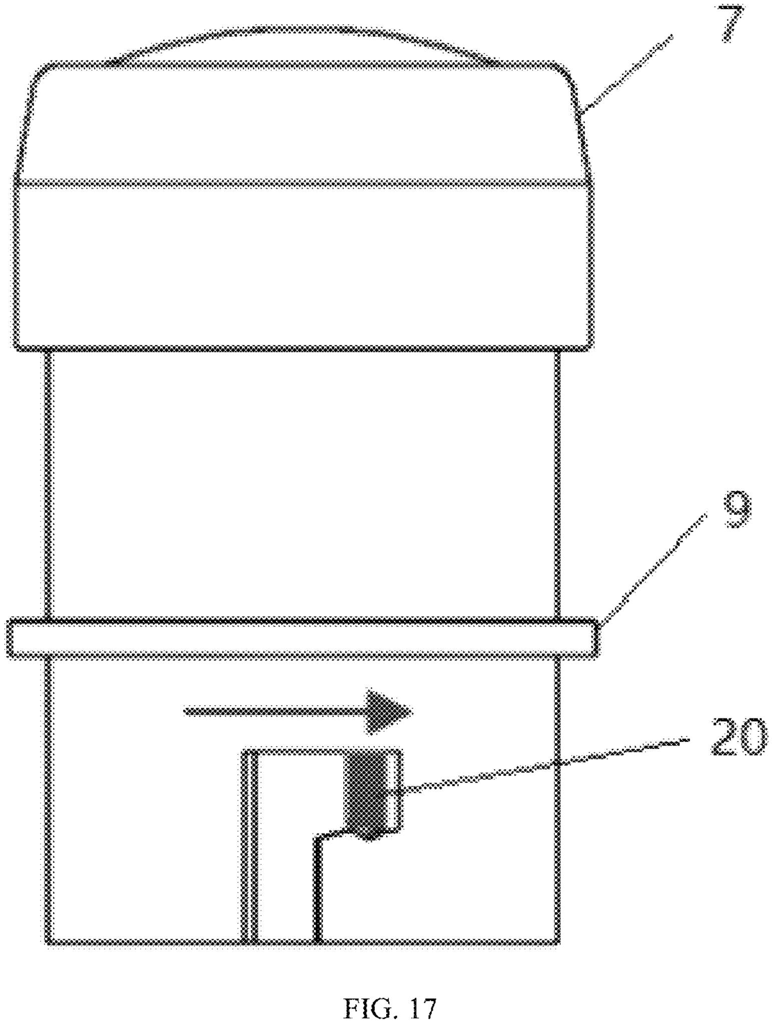
FIG. 17 is a side view schematically describing a single lens module block and a locking structure in an already locked state as shown in FIG. 14.
Figure 18:
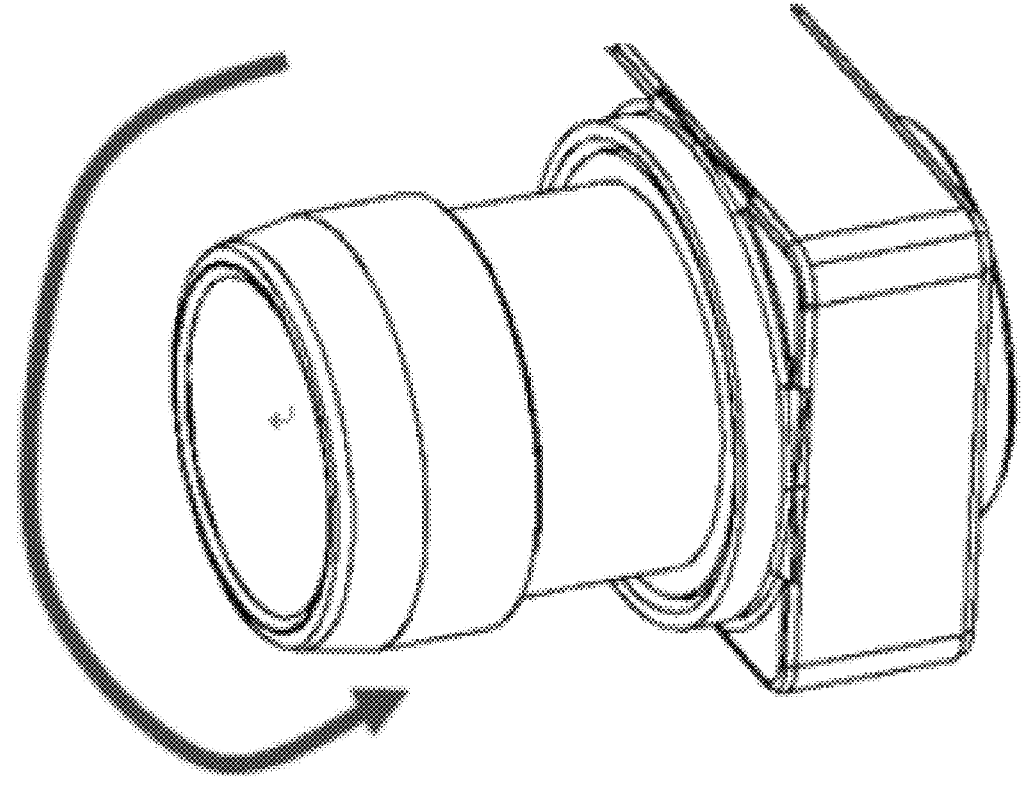
FIG. 18 is an assembly view schematically describing a single lens module block and a locking structure assembled together as shown in FIG. 14.

Mode 5 (as shown in FIGS. 14 to 18): the fastening mechanism includes a locking structure. In this case, the lens barrel 7 has the convex ring 9 extending outwardly in the radial direction of the lens barrel at the outer periphery of the barrel-body front end. The convex ring 9 has the maximum diameter greater than the inner diameter of the through hole 6. The locking structure includes a snap hook 20 protruding from the side wall of the through hole 6 towards the inner part of the through hole 6 and fixedly connected to the side wall of the through hole 6, and an L/T shaped groove positioned at the barrel-body rear end (only the L shaped groove is exemplarily shown in FIGS. 14 to 17). The L/T-shaped groove includes a guiding groove 18 extending in an axial direction of a barrel body from the edge of the barrel-body rear end, and a stop groove 19 extending in a circumferential direction of the barrel body at the end of the guiding groove 18 away from the edge of the barrel-body rear end. The guiding groove 18 and the stop groove 19 are L-shaped or T-shaped. The snap hook 20 is sized to be matched with a width of the L/T shaped groove so that the snap hook 20 can move within the L/T shaped groove (in a direction indicated by the arrows in FIGS. 16 and 17). When the lens barrel 7 is mounted, the lens barrel 7 moves relative to the housing 1 (in a direction indicated by the arrow in FIG. 14) so that the snap hook 20 moves along the guiding groove 18 to the end of the guiding groove 18 (as shown in FIG. 16). The lens barrel 7 is rotated around an optical axis (in a direction indicated by the arrow in FIG. 18) so that the snap hook 20 is housed in the stop groove 19 (as shown in FIG. 17). The snap hook 20 is housed in the stop groove 19 so that the surface of the convex ring 9 facing the front housing 1 is pressed against the outer surface of the periphery of the through hole 6 of the front housing 1. The lens barrel 7 is fixed to the front housing 1 so that the lens module block 15 is fixed to the front housing 1.

In a case of Mode 5, it is additionally stated that in the camera device 200 or 300 with the at least two ocular lenses of the second aspect or the third aspect of the present invention, the stop groove 19 needs to have a length that enables the snap hook 20 to move in the stop groove 19.

In a case of Mode 5, in the camera device 200 or 300 with the at least two ocular lenses of the second aspect or the third aspect of the present invention, being similar to Modes 2 and 3, the convex ring 9 preferably has the pit, the perforation hole or the projection on the surface facing the outer part of the cavity, so that with the pit, the perforation hole or the projection, the lens barrel 7 at the inappropriate mounting angle is rotated around the optical axis of the lens barrel 7 by using the adjusting jig or manually, so as to adjust accordingly the mounting angle of the sensor board 10 fixedly connected to the lens barrel 7. This is because the stop groove 19 has a length that enables the snap hook 20 to move in the stop groove 19.

Being similar to Modes 1 to 4, in Mode 5, the fastening mechanism preferably further includes the spring pad 5. In a case of the presence of the spring pad 5, the spring pad 5 may be positioned between the convex ring 9 and the front housing 1. The spring pad 5 serves to cooperate with the locking structure so that the lens module block 15 may be more stably fixed to the front housing 1.

In addition, in Mode 5, the fastening mechanism may include one or the plurality of sets of locking structures, preferably the plurality of sets of locking structures. In a case of the plurality of sets of locking structures, the locking structures are preferably evenly distributed, i.e. the plurality of snap hooks 20 and L/T-shaped grooves cooperate with each other. The plurality of snap hooks 20 are preferably evenly distributed on the side walls of the through hole 6. The L/T shaped grooves are preferably evenly distributed on the barrel-body rear end. The shapes and sizes of the sets of locking structures may have different but are preferably substantially the same.

Further, it should be noted that: a person skilled in the art can fully understand that in the camera device 300 with the at least two ocular lenses of the third aspect of the present invention, the fastening mechanism of Mode 5 is only suitable for fixing to the front housing 1 the lens module block 15 in which the lens barrel 7 passes through the non-elongate through hole 6, as shown in FIGS. 14 to 18.

In Modes 1-5, there is no limitation on the material, shape, etc. of the spring pad 5, as long as the forgoing objectives can be achieved. For example the spring pad 5 may be made of a material with elasticity, such as rubber, etc. In addition, the spring pad 5 may for example be in the form of a spring, such as the blocking spring, preferably a disc spring, more preferably the diaphragm spring.

It should also be noted that the five modes of fastening mechanism exemplified above are not limiting. It is entirely possible for a person skilled in the art to think of and practice other modes based on the forgoing modes, such as, but not limited to the following situations: a person skilled in the art can readily think of the formation of internal threads inside the through hole 6. The internal threads can cooperate with external threads formed in the outer periphery of the lens barrel 7, so that the lens barrel 7 is fixed to the front housing 1. These alternative modes can likewise realize the objectives of the present invention, and are certainly within the scope of protection of the present invention.

It is also to be noted that in the camera device 200 or 300 with the at least two ocular lenses of the second aspect or the third aspect of the present invention, the fastening mechanism for fixing each of the plurality of lens modules 15 to the front housing 1 may be the same or different, preferably the same.

It is obvious to a person skilled in the art that the present invention is not limited to the details of the exemplary embodiments described above, and that the present invention can be realized in others specific forms without departing from the aim or basic features of the present invention. Therefore, these specific embodiments should be regarded as exemplary and non-limiting from any standpoint. The scope of the present invention is defined by the appended claims rather than the forgoing description. It is therefore intended that all variations falling within the meaning and scope of equivalent elements of claims be encompassed by the present invention. Any reference numbers in the claims should not be considered as limiting the claims involved.

In addition, it should be understood that although this specification is described in terms of embodiments, each embodiment does not only include an independent technical solution. This description in the specification is only for the sake of clarity. A person skilled in the art should take the specification as a whole. The technical solutions in each embodiment can also be appropriately combined to form other implementations that can be understood by a person skilled in the art. These other embodiments are also covered by the scope of protection of the present invention.

It should be further understood that the forgoing specific embodiments are only used for interpreting the present invention. The protection scope of the present invention is not limited thereto. A person skilled in the art can easily make changes or substitutions within the technical scope disclosed by the present invention according to the technical solution and its invention conception, which should be covered within the protection scope of the present invention.

Further, the entirety of the disclosure in the prior art of literature cited in the specification of the present invention is incorporated by reference into the present invention and is therefore part of the disclosure of the present invention.

What is claimed is:

1. A camera device (100), comprising a lens module (3), a front housing (1), and a rear housing (2), wherein the front housing (1) has a through hole (6), and the rear housing (2) is connected to the front housing (1) to form a cavity positioned between the front housing (1) and the rear housing (2), characterized in that the lens module (3) comprises a lens module block (15), and the camera device (100) further comprises a fastening mechanism fixing the lens module (15) to the front housing (1), wherein the lens module (15) comprises a lens barrel (7) having a barrel-body front end and a barrel-body rear end, the lens barrel (7) passing through the through hole (6) so that the barrel-body front end is positioned outside the cavity, and the barrel-body rear end is positioned inside the cavity;

and a convex ring (9) extending outwardly in the radial direction of the lens barrel (7) is provided either on the barrel-body front end or on the barrel-body rear end of the lens barrel (7), the fastening mechanism fixing the lens module block (15) to the front housing (1) on one of the barrel-body front end and the barrel-body rear end of the lens barrel (7) that is not provided with the convex ring (9), the lens barrel (7) is fixed to the front housing (1) by clamping the front housing (1) together with the convex ring (9).

2. The camera device (100) according to claim 1, characterized in that the camera device is further provided with a sensor board (10) fixedly connected to the lens barrel (7).

3. The camera device (100) according to claim 2, characterized in that the camera device is further provided with a printed circuit board (11), the sensor board (10) being connected to the printed circuit board (11) via a flexible flat cable (12).

4. The camera device (100) according to claim 3, characterized in that the sensor board (10) and/or the printed circuit board (11) forms a rigid-flexible board with a flexible board present between the sensor board and the printed circuit board.

5. The camera device (100) according to claim 1, characterized in that the lens module block (15) comprises a one-piece lens module block.

6. The camera device (100) according to claim 1, characterized in that the fastening mechanism is a nut (4), the lens barrel (7) further has threads (8) capable of cooperating with the nut (4) and formed on the outer periphery of one of the barrel-body front end and the barrel-body rear end that is not provided with the convex ring (9), wherein the nut (4) has a maximum outer diameter greater than the inner diameter of the through hole (6), the convex ring (9) has a maximum outer diameter greater than the inner diameter of the through hole (6), and the nut (4) cooperates with the threads (8) and fixes the lens barrel (7) to the front housing (1) with the front housing (1) clamped by the nut (4) and the convex ring (9).

7. The camera device (100) according to claim 6, characterized in that the fastening mechanism further comprises a spring pad (5) positioned between the nut (4) and the front housing (1) and/or between the convex ring (9) and the front housing (1).

8. The camera device (100) according to claim 6, characterized in that the nut (4) has a pit, a perforation hole or a projection on a surface facing an inner part of the cavity, so that with the pit, the perforation hole or the projection, the nut (4) is cooperatively screwed onto the threads (8) of the barrel-body rear end of the lens barrel (7), with an adjusting jig or manually.

9. The camera device (100) according to claim 1, characterized in that the fastening mechanism is a blocking spring (17)

the lens barrel (7) further has an axial groove (16) capable of cooperating with the blocking spring (17) and formed on the outer periphery of one of the barrel-body front end and the barrel-body rear end that is not provided with the convex ring (9), wherein the blocking spring (17) has a maximum outer diameter greater than the inner diameter of the through hole (6), the convex ring (9) has a maximum outer diameter greater than the inner diameter of the through hole (6), the blocking spring (17) cooperates with the axial groove (16) and fixes the lens barrel (7) to the front housing (1) with the front housing clamped by the blocking spring (17) and the convex ring (9).

10. The camera device according to claim 9, characterized in that the fastening mechanism further comprises a spring pad (5) positioned between the blocking spring (17) and the front housing (1) and/or between the convex ring (9) and the front housing (1).

11. The camera device (100) according to claim 1, characterized in that the fastening mechanism comprises a locking structure, and the lens barrel (7) has a convex ring (9) extending outwardly in the radial direction of the lens barrel at the outer periphery of the barrel-body front end, wherein the convex ring (9) has a maximum diameter greater than the inner diameter of the through hole (6), the locking structure includes a snap hook (20) protruding from a side wall of the through hole (6) toward an inner part of the through hole and fixedly connected to the side wall of the through hole, and an L/T-shaped groove positioned at the barrel-body rear end, the L/T-shaped groove including a guiding groove (18) extending in an axial direction of a barrel body from the rear end edge of the barrel, and a stop groove (19) extending in a circumferential direction of the barrel body at an end of the guiding groove away from an edge of the barrel-body rear end, the guiding groove (18) and the stop groove (19) being L-shaped or T-shaped, the snap hook (20) is sized to be matched with a width of the L/T shaped groove so that the snap hook (20) is capable of moving within the L/T shaped groove, and when in a mounted position, the snap hook (20) is housed in the stop groove (19), the snap hook (20) is housed in the stop groove (19) so that the convex ring (9) is tightly attached to the front housing (1), fixing the lens barrel to the front housing (1).

12. The camera device according to claim 11, characterized in that the fastening mechanism further comprises a spring pad (5) positioned between the convex ring (9) and the front housing (1).

13. The camera device according to claim 1, characterized in that further comprises a second lens modules (3), the front housing (1) having a second through hole, the second lens module (3) comprises a second lens module block (15), and the camera device (200) further comprises a second fastening mechanism, the second lens module (15) comprises a second lens barrel (7) having a second barrel-body front end and a second barrel-body rear end, the second lens barrel (7) passing through the second through hole (6) so that the second barrel-body front end is positioned outside the cavity, and the second barrel-body rear end is positioned inside the cavity;

a second convex ring extending outwardly in the radial direction of the second lens barrel (7) is provided either on the second barrel-body front end or on the second barrel-body rear end of the second lens barrel (7), the second fastening mechanism fixing the second lens module block (15) to the front housing (1) on one of the second barrel-body front end and the second barrel-body rear end of the second lens barrel (7) that is not provided with the second convex ring (9), and at least one of the fastening mechanism and the second fastening mechanism allows the corresponding lens module (15) thereof or the second lens module to be rotated around an optical axis thereof before being fixed to the front housing (1).

14. The camera device of claim 13, characterized in that the second through hole is an elongate through hole (6'), the second fastening mechanism allowing the second lens module block (15) to be fixed to the front housing (1) at different positions of the second through hole (6').

15. The camera device according to claim 13, characterized in that the structure of the second lens module is the same with that of the lens module.

16. The camera device of claim 1, characterized in that is further provided with a second lens module, and the through hole is an elongate through hole, the second lens module (3) comprises a second lens module block (15), and the camera device (200) further comprises a second fastening mechanism, the second lens module block (15) comprises a second lens barrel (7) having a second barrel-body front end and a second barrel-body rear end, the second lens barrel (7) passing through the second through hole (6) so that the second barrel-body front end is positioned outside the cavity, and the second barrel-body rear end is positioned inside the cavity;

a second convex ring extending outwardly in the radial direction of the second lens barrel (7) is provided either on the second barrel-body front end or on the second barrel-body rear end of the second lens barrel (7), the second fastening mechanism fixing the second lens module block (15) to the front housing (1) on one of the second barrel-body front end and the second barrel-body rear end of the second lens barrel (7) that is not provided with the second convex ring (9), and at least one of the fastening mechanism and the second fastening mechanism allows the corresponding lens module (15) thereof or the second lens module to be rotated around an optical axis thereof before being fixed to the front housing (1).

* * * * *